United States Patent [19]

Simokat

[11] 4,210,779
[45] Jul. 1, 1980

[54] AMPLITUDE MODULATED TELEPHONE CARRIER SYSTEM AND TERMINAL EQUIPMENT THEREFOR

[75] Inventor: Frank L. Simokat, Babylon, N.Y.

[73] Assignee: Tii Corporation, Lindenhurst, N.Y.

[21] Appl. No.: 932,706

[22] Filed: Aug. 11, 1978

[51] Int. Cl.² ............................................. H04J 1/12
[52] U.S. Cl. ..................................... 179/2.51; 370/72
[58] Field of Search .......... 179/15 FD, 15 FS, 2.5 R, 179/15 FE; 329/50; 325/330

[56] References Cited

U.S. PATENT DOCUMENTS

| 3,714,593 | 1/1973 | Kime et al. | 329/50 |
| 4,087,639 | 5/1978 | Beene et al. | 179/2.5 R |

Primary Examiner—James W. Moffitt
Assistant Examiner—Joseph A. Popek
Attorney, Agent, or Firm—Le Blanc, Nolan, Shur & Nies

[57] ABSTRACT

A plural channel amplitude modulated frequency division multiplexed station carrier system wherein the receivers of the subscriber and central office channel terminal circuits are each equipped with a bandpass filter which is tuned to the carrier frequency to be received and with a circuit for synchronously detecting the carrier signal to which the bandpass filter is tuned. In the subscriber channel terminal circuits the bandpass filters are of the first order type, and in the central office channel terminal circuits the order of each bandpass filter is no greater than two. Carrier signal level adjustment is provided at the subscribers' end of the carrier system's transmission line for the purpose of causing all of the central office transmitted carrier signals to arrive at the subscriber channel terminal receivers at or at least approximately at a common level and for the additional purpose of causing all of the subscriber transmitted carrier signals to arrive at the central office channel terminal receivers at or at least approximately at a common level.

19 Claims, 8 Drawing Figures

AMPLITUDE MODULATED TELEPHONE CARRIER SYSTEM AND TERMINAL EQUIPMENT THEREFOR

FIELD OF INVENTION

This invention relates to improvements in amplitude modulated, frequency division multiplexed telephone carrier systems and is particularly concerned with, though not limited to, central office and subscriber terminal equipment for plural channel station carrier systems.

The designations "station carrier" and "subscriber carrier" are used interchangeably herein to refer to those telephone carrier systems which are employed to establish communication between a central office or central station and the remote telephone stations of individual subscribers.

Trunk carrier systems, on the other hand, are employed between central office exchanges (major switching points). The designations "telephone carrier" and "telephone carrier system" are used herein to refer to both trunk and station carrier systems.

BACKGROUND OF INVENTION

In a plural channel AM station carrier system a plurality of central office transmitting and receiving terminals (also referred to as central office channel terminal units or circuits) are connected by a single transmission line to a corresponding number of subscriber transmitting and receiving terminals (also called subscriber channel terminal units or circuits) which are located remotely from the central office. The central office and subscriber terminal units each have a transmitter equipped to transmit a carrier signal of pre-selected frequency and a receiver tuned to receive a carrier signal of a different pre-selected frequency. The carrier signals transmitted over the transmission line from the central office and subscriber channel terminal units are frequency division multiplexed.

The receivers in the central office and subscriber channel terminal units each comprise some sort of frequency selective means for tuning it to receive just one of the incoming carrier frequencies so that each receiver receives a different pre-selected carrier frequency. In this manner each subscriber channel terminal unit is paired with a different central office channel terminal unit to make up a carrier derived circuit or two-way transmission channel.

Prior to this invention it has been the general custom to use bandpass filters as the means for achieving carrier frequency selectively in the receivers of the central office and subscriber channel terminal units. It has also been the general practice to equip the receivers with envelope detectors for effecting carrier signal detection.

In a typical telephone carrier system receiver the frequency selective bandpass filter (hereinafter called a channel or receive bandpass filter) is usually of the LC type and is tuned to a pre-selected carrier frequency so that it effectively rejects all but the desired carrier signal and its sidebands. The envelope detector is connected in the receiver to detect the received carrier signal, and the frequency components resulting from the detection are applied to a low pass filter which has an upper cutoff frequency of about 3000 Hz for separating the voice frequency detection components from the detected carrier frequency component and the other components having frequencies higher than the upper limit of 3000 Hz. In this way voice frequency signals present at the output of the detector will be passed by the low pass filter for transmission to a subscriber's telephone.

Envelope detectors are advantageous because of their low cost, simplicity and reliability in operation. They do, however, have a major drawback in that they create a potential crosstalk problem. The crosstalk problem can develop because the envelope detector will produce the sum and difference frequency components for all combinations of the applied carrier and sideband frequencies. Since any practical channel bandpass filter design will not completely attenuate the unwanted carrier frequencies and their sidebands, they will be applid in partially attenuated form to the envelope detector. As a result, the side frequencies of each unwanted carrier frequency will be demodulated at the envelope detector as frequencies that are in the 300 Hz to 3000 Hz audio range. These demodulated voice frequency signal components from the disturbing channel are therefore within the passband of the receiver's low pass filter and will unavoidably be passed in unattenuated form by the low pass filter. They consequently represent disturbing crosstalk signals that can be heard at the subscriber's telephone.

In the past it has been the general practice to reduce the power in these crosstalk signals to an acceptable level by achieving a more effective rejection of the unwanted carrier frequencies and their sidebands at the receiver's channel bandpass filer. This is done by increasing the order of or the number of pole pairs in the bandpass filter to establish a faster rolloff.

In a carrier system using 8 kHz spacing between adjacent carrier frequencies for example, a three or four pole channel bandpass filter is normally required to reduce the crosstalk to a level that is acceptable under Rural Electrification Administration (REA) standards. For this reason the receive bandpass filters used in prior carrier system receivers are relatively expensive and represent a significant percentage of the cost of the signal receiving equipment.

In an IEEE technical paper published in 1975 and entitled "FDM Subscriber Carrier: Expansion of Electronics In Telephone Plant Technology", synchronous detection of the desired incoming carrier signal was proposed in lieu of envelope detection for the cost-saving purpose of eliminating the channel bandpass filters in a multi-channel AM station carrier system. This IEEE paper discloses a carrier system receiver in which all of the incoming carrier signals are applied to a synchronous detector without any pre-detection bandpass filtering and in which a phase locked loop is used for generating the desired synchronous carrier signal frequency to drive the synchronous detector.

Unlike an envelope detector, a synchronous detector produces difference frequency components which are only the difference between the zero beat frequency (i.e., the frequency of the desired carrier signal) and all of the other carrier and sideband frequencies that pass into the receiver to the input side of the detector. For a carrier frequency allocation having an 8 kHz spacing between adjacent carriers, the closest side frequency in each adjacent channel will synchronously demodulate as a 5 kHz signal component rather than a 3 kHz signal as is the case with an envelope detector.

Of all the unwanted components of detection at the output of the synchronous detector, 5 kHz will be the lowest frequency from a neighboring channel for the 8 kHz carrier frequency spacing example given above. While this 5 kHz signal component is within a person's hearing range, it is above the 3000 Hz cutoff of the receiver's low pass filter and therefore can be attenuated sufficiently by making the filter's rolloff fast enough.

Thus by using the synchronous detector to cause the unwanted signal components to have frequencies above the 3000 Hz cutoff and by making the low pass filter's rolloff fast enough, the crosstalk problem may be avoided.

While advantageously eliminating the channel bandpass filters, the system described in the above-mentioned IEEE paper is subject to a number of troublesome conditions such as the tendency of the phase locked loop to fall out of lock during operation, the tendency of the phase locked loop to acquire lock with a signal of improper frequency, and the tendency of the phase locked loop to become unstable and break into oscillation under certain conditions. To eliminate these problems additional circuitry is required, thus offsetting to an extent the cost advantage derived from eliminating the bandpass filters.

SUMMARY AND OBJECTS OF INVENTION

The present invention avoids the use of expensive bandpass filters of relatively high orders and yet does not have the troublesome conditions or expensive circuitry associated with the synchronous detection arrangement disclosed in the IEEE paper mentioned above. Additionally, it keeps crosstalk down to an acceptable level and at the same time permits the use of a low pass filter that is more simplified and less expensive than the one that would normally be required for the receiver shown in the IEEE paper.

These advantageous, cost-reducing features are achieved in the present invention by equipping the communications receiver with a low cost first or second order channel bandpass filter and by driving a synchronous detector in the receiver with an inexpensive zero crossover detector. The first or second order bandpass filter is more simplified and much less expensive than the third or fourth order bandpass filters which is required for envelope detectors.

Although the first or second order filter does not attenuate the unwanted frequencies as much as the higher order bandpass filters, the combined operation of the low order channel bandpass filter and the synchronous detection in this invention has the surprising and unique effect of reducing the power in the VF crosstalk signals to or below an acceptable level without creating any troublesome conditions. This novel receiver circuit design additionally permits the use of an inexpensive single coil low pass filter.

In the illustrated embodiment the foregoing features of the present invention are incorporated into, but are not limited to, a station carrier system in which the subscriber channel terminal units are connected by way of a four-wire subscriber group terminal unit to the subscribers' end of the transmission line and in which the central office channel terminal units are connected by way of a further four-wire group terminal (referred to as the central office group terminal unit) to the central office end of the transmission line.

A group automatic gain and slope control or equalization circuit is advantageously included in the receive section of the subscriber group terminal. This group automatic gain and slope control circuit acts on the complete composite of incoming, central office-transmitted carrier signals in such a way that the incoming carrier signals are adjusted to or closely to a common pre-selected level regardless of the transmission line length between termination points. By adjusting the strengths of incoming carriers to a common level, no one carrier signal will be significantly stronger than the others to cause objectionable interference in the receivers of neighboring channels at the subscriber terminal equipment.

In addition to the foregoing, the transmit section of the subscriber group terminal unit is advantageously equipped with an automatic carrier level coordination control circuit which adjusts the levels of the outgoing subscriber-transmitted carrier signals as a group.

Carrier level coordination control involves the coordination of carrier levels between two or more carrier systems operating at corresponding frequencies and having their transmission lines in the same multi-conductor cable or in otherwise close proximity to each other. The carrier signal power levels in each system are so adjusted that at any point along the cable, carrier signals of like frequencies will be at least approximately at the same power level to minimize crosstalk due to power differentials.

In the illustrated embodiment, the carrier level coordinating adjustment or control of the carrier signal power levels is automatically accomplished (a) by developing a single d.c. control signal which is a measure of transmission line length over which the carrier signals are to be transmitted and (b) by controlling the transmit power level of each of the carrier signals as a function of the above-mentioned d.c. control signal and also as a function of the carrier signal's own frequency. The d.c. control signal may be derived from the automatic gain and slope control circuit in the receive section of the subscriber group terminal unit.

In addition to controlling the carrier signal levels to provide level coordination between two or more individual telephone carrier systems, the group automatic carrier coordination control circuit also advantageously adjusts the levels of the subscriber-transmitted carrier signals in each carrier system in such a way that they arrive at the central office or other termination point at or at least approximately at the same level. By this slope adjustment no one carrier signal arriving at the central office terminal equipment is significantly stronger than any of the other subscriber-transmitted carrier signals to cause objectionable interference in the receivers of neighboring channels at the central office terminal equipment.

With the foregoing in mind a major object of this invention resides in the provision of a novel plural channel AM telephone carrier system whose cost is reduced without compromising performance.

Another important object of this invention is to provide a novel carrier system communication receiver in which the filter and detection equipment is less expensive than prior equipment using a carrier-detecting envelope detector or a phase locked loop in a synchronous detection circuit.

Other important objects of this invention are the provision of a novel telephone carrier system communication receiver in which:

1. only a one or two pole pair channel bandpass filter is used in conjunction with a synchronous detector to keep crosstalk at an acceptable level in the voice frequency portion of the receiver;

2. a zero crossover detector is used to supply the synchronous signal for driving the synchronous detector in the receiver; and 3. a one-coil low pass filter is used to separate voice frequency signals from those components of detection having frequencies in excess of approximately 3000 Hz.

Further objects of this invention will appear as the description proceeds in connection with the appended claims and the below-described drawings.

DESCRIPTION OF DRAWINGS

FIG. 8 is a schematic block diagram of a carrier installation having a pair of station carrier systems connected to a common central office.

DETAILED DESCRIPTION

Figure 1:
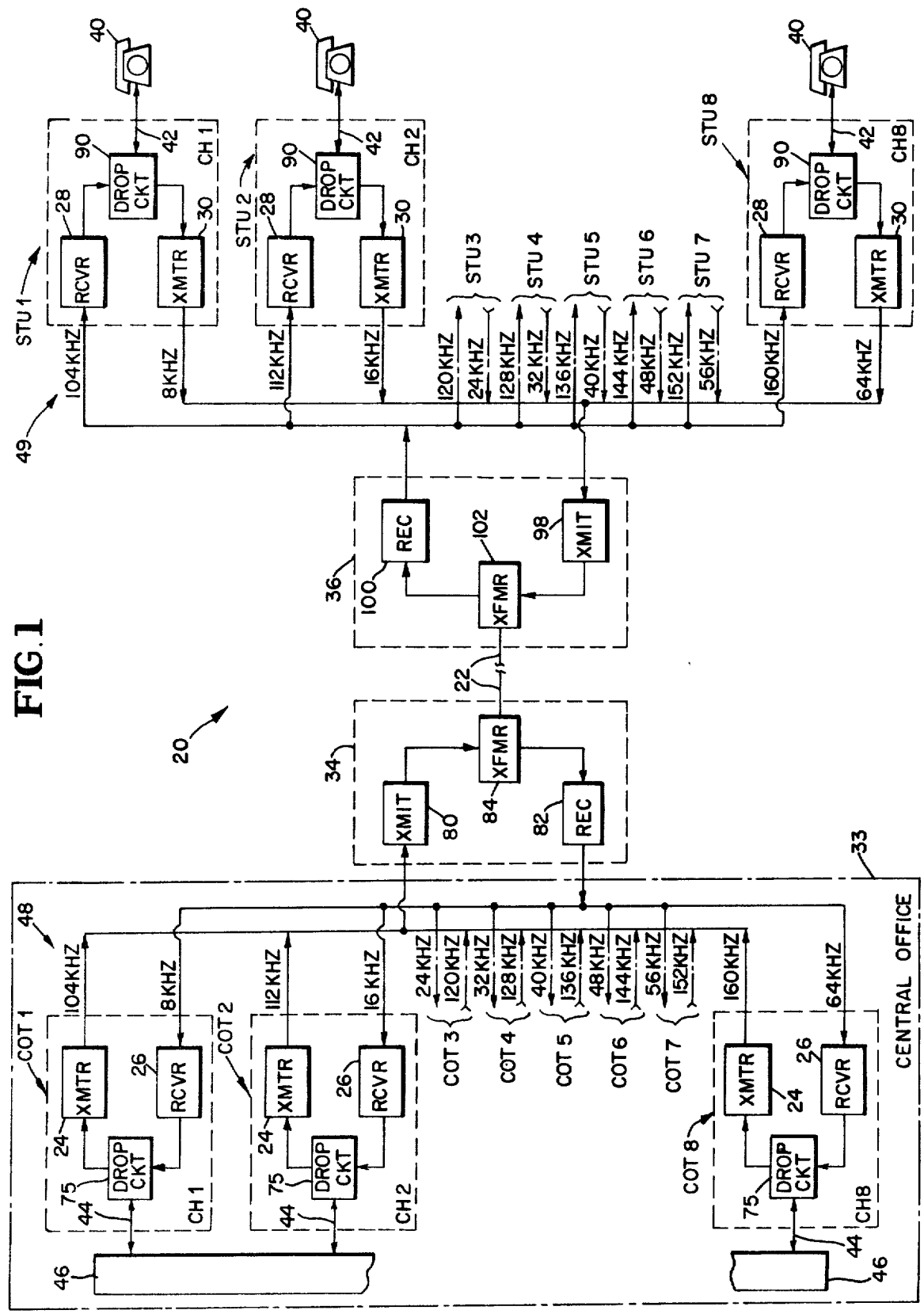
FIG. 1 is a schematic block diagram of a plural channel AM station carrier system incorporating the principles of this invention.

Referring to FIG. 1, one embodiment of a plural channel AM station carrier system (indicated at 20 in the drawings) incorporating the principles of this invention is shown to comprise a single two-conductor transmission line 22, a selected number of central office transmitting and receiving channel terminal circuits or units, and a corresponding number of subscriber transmitting and receiving channel circuits or units. Any suitable number of central office and subscriber channel terminal circuits may be employed depending upon the number of channels desired. For example, eight central office channel terminal circuits and eight subscriber channel terminal circuits may be employed as shown to make up an eight-channel carrier system. The eight central office transmitting and receiving terminal circuits are indicated at COT1, COT2, COT3, COT4, COT5, COT6, COT7 and COT8, and the eight subscriber channel terminal circuits are indicated at STU1, STU2, STU3, STU4, STU5, STU6, STU7 and STU8.

Since the central office terminal circuits COT1—COT8 are alike, only three (namely COT1, COT2 and COT8) are illustrated in any detail in FIG. 1. For the same reason only three of the subscriber terminal circuits, namely STU1, STU2 and STU8, are detailed in FIG. 1.

As shown in FIG. 1, each of the central office terminal circuits COT1–COT8 comprises a communication transmitter 24 for transmitting a carrier signal of preselected frequency and a communication receiver 26 tuned to receive a carrier signal from only a preselected one of the subscriber terminal circuits. Likewise, the subscriber terminal circuits STU1–STU8 each includes a communication receiver 28 tuned to receive a carrier signal from only a pre-selected one of the central office circuits and a transmitter 30 for transmitting a carrier signal of pre-selected frequency.

Each of the subscriber terminal circuits STU1–STU8 is paired with a different one of the central office terminal circuits COT1–COT8 to provide eight two-way transmission channels. It is understood that each of these transmission channels has two different allocated frequency bands to provide service for a subscriber, one band being for transmission in one direction from the central office terminal equipment to the subscriber terminal equipment, and the other band being for transmission in the opposite direction from the subscriber terminal equipment to the central office terminal equipment. In this example, the subscriber terminal circuits STU1–STU8 are paired with the central office terminal circuits COT1–COT8, respectively. The transmission channels are designated by the reference characters CH1–CH8. The frequency spacing between adjacent carrier signals transmitted in either direction may be 8 kHz.

The central office terminal circuits COT1–COT8 form a part of the central office terminal equipment and are located at a central office or central office station which is generally indicated at 33 in FIG. 1. The subscriber channel terminal circuits STU1–STU8 form a part of the subscriber terminal equipment and are located remotely from central office 33 at the subscriber's end of the transmission line 22.

The transmitters and receivers in each of the terminal circuits COT1–COT8 are connected to line 22 by way of a central office group terminal unit or circuit 34 which is also located at the central office. The transmitters and receivers in each of the subscriber terminal circuits STU1–STU8 are connected to line 22 remotely from central office 33 by way of a subscriber group terminal unit or circuit 36.

The subscriber channel terminal circuits STU1–STU8 are separately connected to the telephones (indicated at 40 in FIG. 1) of eight different subscribers by suitable means such as subscriber drops 42. At the central office, the central office terminal circuits COT1–COT8 are separately connected by central office drops 44 to appropriate terminals in the central office exchange equipment which is indicated at 46 in FIG. 1.

As is customary in telephone carrier systems, each of the central office terminal circuits COT1–COT8 transmits at a pre-selected carrier frequency that is different from the transmission carrier frequencies allocated to the remaining central office channel terminal circuits and also different from the carrier frequencies that are transmitted up the transmission line 22 in the opposite direction from the subscriber channel terminal circuits STU1–STU8. Likewise, the subscriber terminal circuits STU1–STU8 transmit at pre-selected carrier frequencies that are different from each other and different from the transmit frequencies assigned to the central office terminal circuits COT1–COT8. The allocation of different carrier frequencies for the carriers on transmission line 22 is referred to and designated as frequency division multiplexing (FDM).

A typical FDM allocation scheme of carrier frequencies is shown in FIG. 1 for the eight channels in the carrier system. According to this allocation scheme the carrier frequencies transmitted from the central channel terminal circuits COT1–COT8 are all contained in a frequency band (104 kHz–160 kHz) that is higher than the band (8 kHz–64 kHz) containing the carrier frequencies that are transmitted from the subscriber channel terminal circuits STU1–STU8.

As shown in FIG. 1, all of the central office terminal circuits COT1–COT8 and unit 34 may advantageously be grouped together in a single central office terminal. Similarly, all of the subscriber terminal circuits STU-1–STU8 and unit 36 may advantageously be grouped together in a single subscriber terminal.

As shown in FIG. 1 the central office group terminal unit 34 is a four-wire circuit providing separate transmit and receive signal paths or sections 80 and 82 which are coupled by a transformer 84 to the central office end of transmission line 22. The transmit signal path 80 feeds the central office-transmitted carrier signals from the transmitters of the central office channel terminal circuit COT1–COT8 to transmission line 22. The receive signal path feeds the arriving subscriber transmitted carrier signals from transmission line 22 to the receivers in the central office channel terminal circuits COT-1–COT8.

Figure 2:
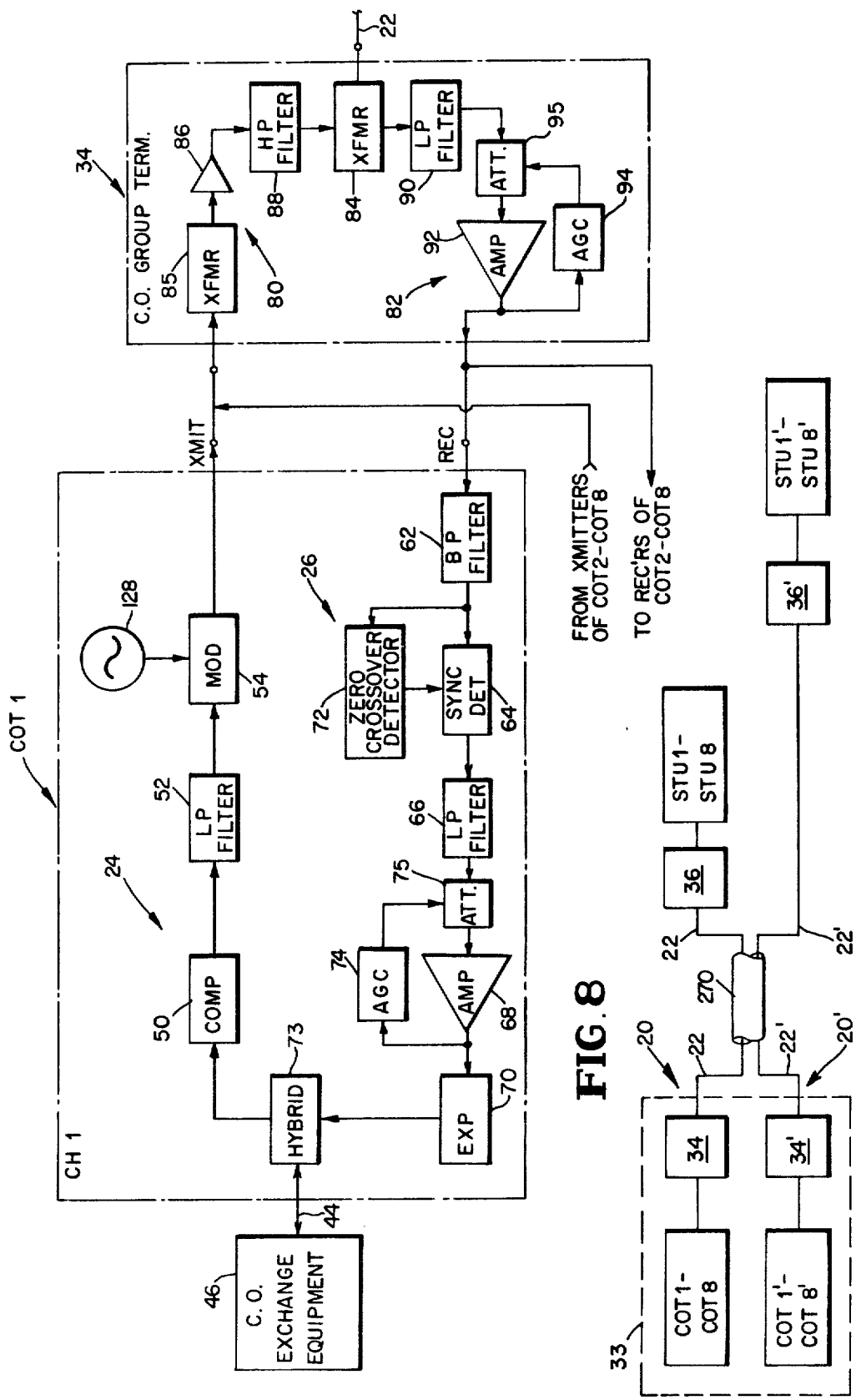
FIG. 2 is a more detailed schematic block diagram of the central office group terminal unit and one of the central office channel terminal circuits shown in FIG. 1.

As shown in FIG. 2 the transmit section of group terminal unit 34 includes a transformer 85, an amplifier 86 and a high pass directional filter 88. The receive section of the central office group terminal unit includes a low pass directional filter 90, a fixed gain amplifier 92, an automatic gain control circuit 94 and an attenuator 95 or other variable gain circuit.

All of the carrier signals transmitted from the transmitters 24 of the central office channel terminal circuits COT1–COT8 are summed into transformer 85 which couples the resulting composite to amplifier 86. Amplifier 86 amplifies the outgoing composite of the central office-transmitted carrier signals, and the amplified composite is fed to the high pass filter 88. Filter 88 passes the outgoing central office-transmitted carrier frequencies which are in the high frequency group (104 kHz–160 kHz) while rejecting the low group of subscriber-transmitted carrier frequencies (8 kHz–64 kHz) to keep the low group of carrier frequencies out of the transmit section of unit 34. From filter 88 the central office-transmitted carrier signals are coupled by transformer 84 to transmission line 22 for transmission to the remote subscriber terminal equipment.

Filter 90, which is in the receive path of group terminal unit 34, is connected between transformer 84 and amplifier 92 and passes the low group of subscriber-transmitted carrier frequencies, while rejecting the high group of central office-transmitted carrier frequencies to keep the high group of carrier frequencies out of the receive section of unit 34. The subscriber-transmitted carrier frequencies passed by filter 90 are attenuated by attenuator 95 under the control of the AGC circuit 94 and are then amplified by amplifier 92. From the output of amplifier 92 the amplified carrier signals are fed to the receivers 26 in central office terminal circuits COT-1–COT8 and also to the AGC circuit 94 in unit 34. As shown, attenuator 95 is connected to the signal path between filter 90 and amplifier 92.

The group AGC circuit 94 provides a feedback loop and may be of any suitable circuit design for causing attenuator 95 to adjust the levels of the arriving carrier signals in such a way that the carrier signals are stabilized at a predetermined level despite variations in the levels in the incoming carrier signals at the input of filter 90.

Similar to group terminal unit 34, unit 36 is a four-wire circuit providing separate transmit and receive signal paths or sections 98 and 100 which are coupled by a transformer 102 to the end of transmission line 22 remote from central office 33. The receive signal path in group terminal unit 36 feeds the carrier signals arriving from the central office to the receivers in the subscriber channel terminal circuits STU1–STU8. The transmit signal path in unit 36 feeds the carrier signals from the transmitters in the subscriber channel terminal circuits STU1–STU8 to transmission line 22 for transmission up the line to the central office terminal equipment.

Figure 3:
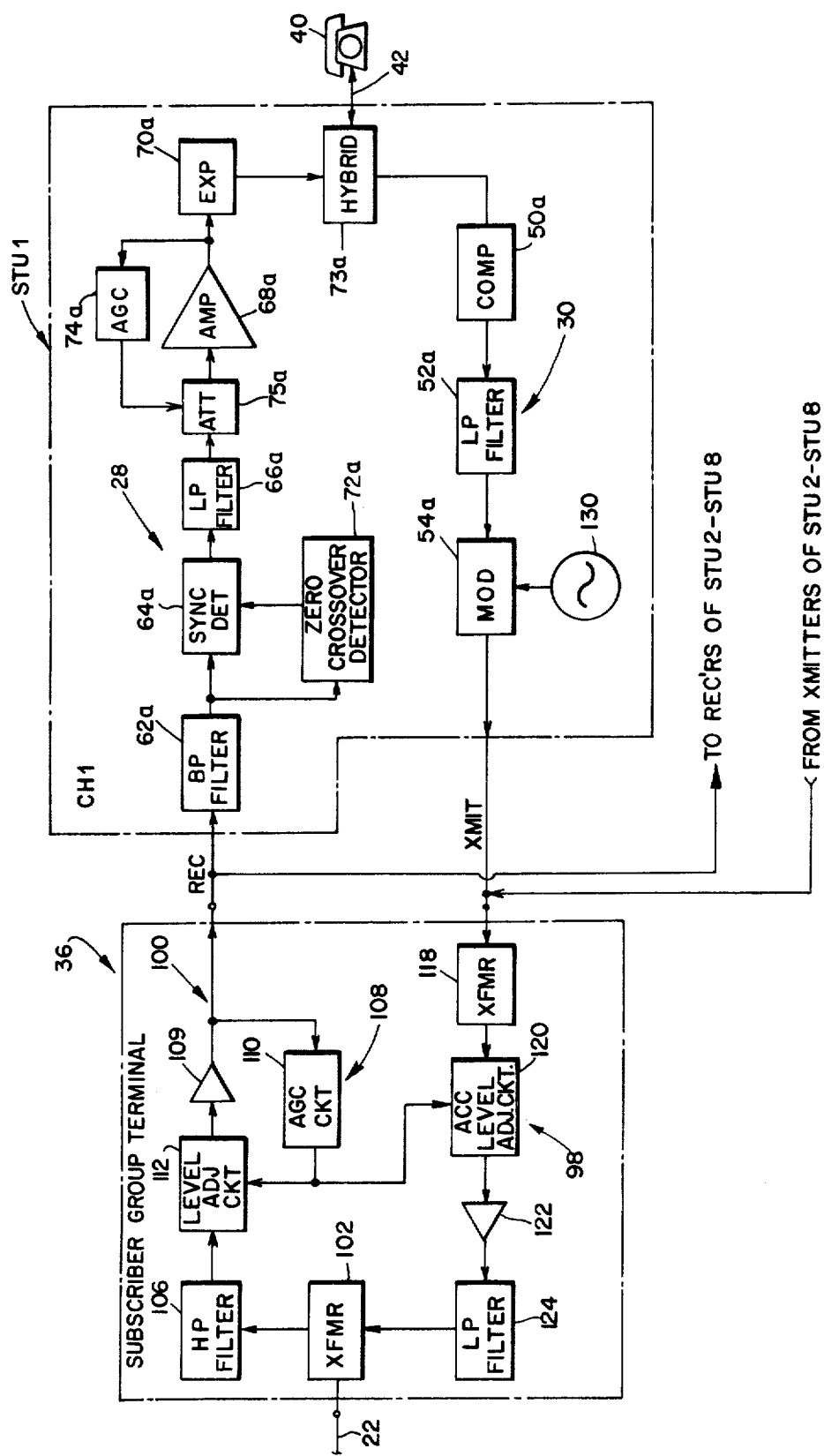
FIG. 3 is a more detailed schematic block diagram of the subscriber group terminal unit and one of the subscriber channel terminal circuits shown in FIG. 1.

As shown in FIG. 3 the receive section 100 of the subscriber group terminal unit 36 is equipped with a high pass directional filter 106, group aromatic gain control and slope equalization or level control circuit 108 and a fixed gain amplifier 109. Circuit 108 comprises a pair of individual circuits, namely an AGC (automatic gain control) circuit 110 and a carrier level adjusting circuit 112. The level adjusting circuit 112 is under the control of the AGC circuit 110 which provides a feedback loop as shown. The transmit section of the subscriber group terminal unit 36 is equipped with a transformer 118, an automatic carrier level coordination control circuit 120, a fixed gain amplifier 122, and a low pass directional filter 124.

All of the carrier signals transmitted over transmission line 22 from the central office terminal equipment are coupled by transformer 102 to the high pass filter 106. Filter 106 passes this incoming composite of carrier signals, which are in the high frequency group of 104 kHz to 160 kHz, and rejects the low group of subscriber transmitted carrier frequency (8 kHz–64 kHz) to keep the low group of carrier frequencies out of the receive section of unit 36. From filter 106 the incoming group of central office carrier signals are applied to the level adjusting circuit 112.

As will be described in greater detail later on the level adjusting circuit 112 is controlled by the AGC circuit 110 in such a way that it adjusts the amplitudes of all of the incoming carrier signals to or at least approximately to a common, pre-selected level for any transmission line length within the operating capacity of circuit 108. Following this level adjustment the incoming composite of carrier signals is amplified by amplifier 109. From amplifier 109 the composite of the incoming carrier signals is coupled to the receiver 28 in each of the subscriber terminal circuits STU1–STU8. Because of the carrier level adjustment by circuit 112 and because amplifier 109 has a fixed gain, the incoming carrier signals will arrive at the receivers of the subscriber channel terminal circuits at or approximately at a common pre-selected level.

On the transmit side of unit 36, all of the carrier signals transmitted from the subscriber channel terminal circuits STU1–STU8 are summed into transformer 118 which couples the resulting composite to the level adjusting automatic coordination control circuit 120. The automatic coordination control circuit 120 is also under the control of the AGC circuit 110 to adjust the levels of the outgoing signals in such a manner to establish inter-system carrier level coordination control and also to establish slope control to cause the outgoing carrier signals to arrive at the central office 33 or some other transmission line termination point (e.g., a repeater) at or at least approximately at a common, pre-selected level for any transmission line length up to some predetermined maximum value.

Following level adjustment by circuit 120, the composite of the subscriber-transmitted carrier signals are amplified by amplifier 122 and are fed to filter 124. Filter 124 passes the subscriber-transmitted carrier signals, which are in the low group of carrier frequencies, and rejects the high group of central office-transmitted carrier frequencies to keep the high group of carrier frequencies out of the transmit section of unit 36. From filter 124 the subscriber-transmitted carrier signals are coupled by transformer 102 to transmission line 22 for transmission up the line to the central office terminal equipment.

Since the central office channel terminal circuits COT1-COT8 are alike and since the subscriber channel terminal circuits STU1-STU8 are also alike, only the channel terminal circuits for channel 1 (namely, channel terminal circuits COT1 and STU1) will be described in greater detail. To this end, the transmitter of the central office terminal circuit COT1 comprises a compressor 50, a low pass filter 52 and a modulator 54 all connected in series in the manner shown in FIG. 2. The receiver in the central office channel terminal circuit COT1 is equipped with an LC channel bandpass filter 62, a synchronous detector 64, a low pass filter 66, a fixed gain amplifier 68, an expandor 70, a zero crossover detector 72, a hybrid 73 and an automatic gain control circuit 74. In this embodiment the AGC circuit 74 controls an attenuator 75 or other variable gain circuit in the audio portion of receiver 26 to provide AGC action for the voice frequency signals that are passed by filter 66.

The transmitter 30 and receiver 28 in the subscriber channel terminal circuit STU1 are the same as the construction thus far described for the transmitter and receiver in the central office terminal circuit COT1. To the extent that the terminal circuits STU1 and COT1 are the same, like reference numerals have been applied to designate the corresponding parts, except that the reference numerals applied to the parts of the subscriber terminal circuit STU1 have been suffixed by the letter "a" to distinguish them from the reference characters that are applied to designate the parts of the central office channel terminal circuit COT1.

Voice frequency intelligence to be transmitted by way of channel 1 from the central office exchange equipment 46 to the subscriber's telephone 40 is fed by drop 44 and hybrid 73 to compressor 50 in terminal circuit COT1. Compressor 50 compresses the dynamic range of the voice signals in the usual manner.

From compressor 50 the compressed voice frequency signals are fed through filter 52 to modulator 54 where they amplitude modulate a carrier frequency signal from an oscillator 128 to produce a double sideband amplitude modulated carrier signal. Being on channel 1, the frequency of the sinusoidal wave produced by oscillator 128 will be 88 kHz in accordance with the carrier frequency allocation scheme illustrated in FIG. 1. The circuit of filter 52 may be of any suitable design for rejecting frequencies above approximately 3000 Hz. Filter 52 therefore passes only voice frequency information up to 3000 Hz and serves to keep the carrier and other high frequencies out of compressor 50. By limiting the upper frequency of the VF modulating signal to 3 kHz due to the filtering action of filter 52, the upper and lower sidebands of the modulated carrier signal will therefore extend only to a maximum of 3 kHz from the carrier frequency.

The modulated carrier signal supplied at the output of modulator 54 is fed through the transmit section 80 of the central office group terminal unit 34 and is coupled to transmission line 22 for transmission down the line to the subscriber group terminal unit 36 along with the other carrier signals that are transmitted from the central office channel terminal circuits COT2–COT8.

At the subscriber group terminal unit 36 the amplitude modulated 104 kHz carrier signal from the central office channel terminal circuit COT1 is fed along with the other central office-transmitted carriers through the receive section of terminal unit 36 to the channel bandpass filter 62a in the subscriber channel terminal circuit STU1 as well as to the corresponding channel bandpass filters in the remaining subscriber channel terminal circuits STU2–STU8.

The channel bandpass filters in the subscriber terminal circuits STU1–STU8 are tuned to the different carrier frequencies that are allocated to their associated central office channel terminal circuits COT1–COT8. Each channel bandpass filter therefore passes with the least attenuation the incoming carrier frequency (together with its sidebands) that is allocated to its associated central office channel terminal circuit. Thus, for this example, the channel bandpass filter 62a in the subscriber terminal circuit STU1 will pass the modulated 104 kHz carrier signal with the least attenuation, the 104 kHz carrier being the one transmitted from the central office channel terminal circuit COT1. In a similar fashion the channel bandpass filter (not shown) in subscriber channel terminal circuit STU2 will pass with least attenuation the modulated 112 kHz carrier frequency from central office channel terminal circuit COT2, and so on.

Upon passing through filter 62a, the modulated 104 kHz carrier signal is applied to the synchronous detector 64a and also to the zero crossover detector 72a in terminal circuit STU1. The zero crossover detector 72a operates conventionally to detect or sense the zero crossovers of the received 104 kHz carrier signal to generate a local square wave synchronous signal having the same frequency as the received 104 kHz carrier signal. This square wave synchronous signal is applied to synchronous detector 64a to drive the synchronous detector and thereby cause the synchronous detection of the received 104 kHz carrier signal which is passed through filter 62a. To achieve satisfactory synchronous detection of the received carrier signal, the synchronous signal mentioned above is also required to be at least approximately in phase or approximately 180° out of phase with the received carrier signal. Synchronous detection will be achieved even through there is as much as a 10° phase error (i.e., 0°±10° or 180°±10°) or more between the synchronous signal and the received carrier signal.

When the synchronous signal from the zero crossover detector 72a and the desired incoming carrier signal (in this case the 104 kHz signal) are combined at detector 64a, the resulting beat or different frequency will be zero, and the demodulated or detector output will contain an audio signal reproduction of the transmitted modulation (i.e., the VF signal intelligence which was applied to modulate the carrier at the central office channel terminal circuit COT1).

For example, if a 1 kHz tone is applied to modulate the 104 kHz carrier at the central office channel terminal circuit COT1, the upper and lower side frequencies of the 104 kHz carrier will be 103 kHz and 105 kHz, respectively. Each of these side frequencies will demodulate as a 1 kHz signal at the synchronous detector 64a in the subscriber channel terminal circuit STU1, and the recovered 1 kHz tone will be passed by filter 66a into the audio section of the receiver.

In this embodiment the maximum side frequency that can be present in each of the upper and lower sidebands will be spaced 3 kHz from the carrier frequency. This maximum side frequency will synchronously demodulate at a 3 kHz signal at the output of detector 64a and will therefore be passed by filter 66a which has an upper cutoff of about 3000 Hz. The 3 kHz sideband maximum is typical of commercially available station carrier systems.

The beat or difference frequency between the applied synchronous signal and each of the remaining unwanted carrier signals which are passed in attenuated form by filter 62a will be significantly above the 3000 Hz cutoff of low pass filter 66a. Likewise, the beat or difference frequency between the applied synchronous signal and each of the upper and lower side frequencies of these unwanted carrier signals from channels 2-8 will also be signficantly above the 3000 Hz cutoff of filter 66a. As a result, these undesired frequency components will be filtered off by filter 66a which is connected between the synchronous detector 64a and amplifier 68a as shown.

Considering, for example, the numerical example of allocated carrier frequencies shown in FIG. 1, the adjacent 112 kHz carrier (on channel 2) will demodulate at detector 64a in STU1 as an 8 kHz signal and is consequently easily filtered out by filter 66a. The closest unwanted side frequency will demodulate only as a 5 kHz signal, being spaced 5 kHz from the received carrier frequency of 104 kHz. This 5 kHz component will also be rejected by filter 66a. Filter 66a thus separates the desired voice frequency intelligence from the other components of detection.

The recovered VF signals which are passed by filter 66a are attenuated by attenuator 75a under the control of AGC circuit 74a and are then amplified by amplifier 68a. From amplifier 68a the VF signals are a.c. coupled to expandor 70a. Up to this point in the signal path, the dynamic range of the VF signals are still in their compressed state, having been compressed by the companion compressor 50 in the central office terminal circuit COT1. Expandor 70a operates to restore the VF signals to their original dynamic range. From expandor 70a the voice frequency signals are coupled to the receiver in telephone 40 by way of hybrid 73a and drop 42.

As is well known a d.c. component is produced in the output voltage of the synchronous detector 64a by the synchronous detection of the received carrier signal. None of the other unwanted carrier signals from the other transmission channels is effective to develop this d.c. voltage component because of the frequency difference that exists between each of these unwanted carrier signals and the synchronous signal which is supplied by the zero crossover detector 72a.

The d.c. component in the synchronous detector's output voltage therefore varies directly with the strength or peak amplitude of only the received 104 kHz carrier signal in the subscriber channel terminal circuit STU1. This d.c. component will be fed along with the recovered voice frequency signals through filter 66a and amplifier 68a to the AGC circuit 74a. The AGC circuit 74a compares the d.c. component with a d.c. reference voltage to develop an AGC voltage which varies with the difference between the level-indicating d.c. component and the d.c. reference. The AGC voltage is applied to attenuator 75a to vary the extent of signal attenuation at the attenuator in order to stabilize the VF signal level at the output of amplifier 68a against input signal variations. In this manner AGC circuit 74a serves to keep the output sound, which is applied to the receiver of telephone 40, at an essentially constant value despite variations that may occur in the strength of the incoming signal. For accomplishing the foregoing AGC action, AGC circuit 74a and attenuator 75a may be of any suitable design.

The AGC action provided by the AGC circuit 74a in the subscriber channel terminal circuit ensures that the audio level will remain essentially constant even though there is or may be a day-to-day variation in the transmission line attenuation that is not fully compensated for by the group AGC circuit 108 in the subscriber group terminal unit 36.

Considering now the transmission of intelligence from the subscriber terminal equipment to the central office terminal equipment, voice frequency intelligence signals originating from the subscriber's telephone 40 on channel 1 are fed by way of hybrid 73a to compressor 50a. Compressor 50a preforms the same function as compressor 50.

From compressor 50a the compressed voice frequency signals are fed through filter 52a to modulator 54a where they modulate a carrier signal of pre-selected frequency from an oscillator 130 to develop a double sideband amplitude modulated carrier signal for transmission from the subscriber terminal circuit STU1.

The purpose of filter 52a is the same as that described for filter 52. Being on channel 1 the frequency of the sinusoidal waveform produced by oscillator 130 will be 8 kHz in accordance with the carrier frequency allocation scheme illustrated in FIG. 1.

The 8 kHz carrier signal transmitted from the subscriber terminal circuit STU1 and the carriers transmitted from the other subscriber terminal circuits STU2-STU8 are fed through the transmit section of the subscriber group terminal unit 36 to the transmission line 22 for transmission to the central office group terminal unit 34.

At the central office group terminal unit 34 the amplitude modulated 8 kHz carrier signal from the subscriber terminal circuit STU1 is coupled along with the other subscriber-transmitted carriers through the receive section of terminal unit 34 to the channel bandpass filter 62 in the central office channel terminal circuit COT1 as well as the corresponding channel bandpass filters in the remaining central office channel terminal circuits COT2-COT8.

Similar to the channel bandpass filters 62a in the subscriber channel terminal circuits, the channel bandpass filters in the central office terminal circuits COT1-COT8 are so designed that each filter is tuned to and hence passes with the least attenuation the transmit carrier frequency and associated sidebands coming in from its associated subscriber channel terminal circuit. Thus, for this example, the bandpass filter 62 in the central office channel terminal circuit COT1 will pass with the least attenuation the modulated 8 kHz carrier frequency from the subscriber terminal circuit STU1. The corresponding channel bandpass filter in the central office terminal circuit COT2 will pass with the least attenuation the modulated 16 kHz carrier frequency from the subscriber channel terminal circuit STU2, and so on.

Upon passing through filter 62 the modulated 8 kHz carrier signal is applied to the synchronous detector 64 and also to the zero crossover detector 72 in the central office terminal circuit COT1. In the same manner described for the subscriber terminal circuit STU1, the zero crossover detector 72 operates to detect or sense the zero crossovers of the received 8 kHz carrier signal to generate a local square wave synchronous signal which is closely matched in phase and frequency with the received 8 kHz carrier signal. This square wave synchronous signal is applied to synchronous detector 64 to drive the synchronous detector and to thereby cause the synchronous detection of the received 8 kHz carrier signal which is passed through filter 62.

This mode of synchronous detection is the same as that described for the subscriber terminal circuit STU1. Accordingly, the demodulated or detected output of detector 64 will contain an audio signal reproduction of the transmitted modulation (i.e., the VF signal intelligence which was applied to modulate the 8 kHz carrier at the subscriber channel terminal circuit STU1).

Like the synchronous detection operation described for the subscriber channel terminal circuit STU1, the beat or difference frequency between the applied synchronous signal and each of the remaining unwanted carrier signals, which are passed in attenuated form by filter 62, will be significantly above the 3000 Hz cutoff of the low pass filter 66. Likewise, the beat or difference frequency between the applied synchronous signal and each of the upper and lower side frequencies of these unwanted carrier signals from channels 2–8 will also be significantly above the 3000 Hz cutoff of filter 66. These undesired frequencies components will therefore be filtered off by filter 66.

Considering the numerical example of the allocated carrier frequency shown in FIG. 1, the adjacent subscriber-transmit carrier frequency of 16 kHz on channel 2 will demodulate at detector 64 in COT1 as an 8 kHz signal and is consequently easily filtered out by filter 66. The closest unwanted side frequency will demodulate only as a 5 kHz signal, being spaced 5 kHz from the received carrier frequency of 8 kHz. This 5 kHz signal will also be rejected by filter 66. Filter 66 in performing the same function as filter 66a separates the desired voice frequency intelligence from the other components above 3000 Hz.

The VF signals passed by filter 66 are attenuated at attenuator 75 under the control of the AGC circuit 74 and are then amplified by amplifier 68. From amplifier 68 the VF signals are a.c. coupled to expandor 70 which restores the VF signals to their original dynamic range in the same manner as described for expandor 70a. From expandor 70 the voice frequency signals are coupled to the central office exchange equipment 46 by way of hybrid 73 and drop 44.

The synchronous detection of the received 8 kHz carrier signal establishes a d.c. voltage component which varies only in accordance with the strength or peak amplitude of the 8 kHz carrier signal. This d.c. component is fed along with the recovered voice frequency signal components through amplifier 68 to the AGC circuit 74. The AGC circuit 74 employs this d.c. component to control the extent of signal attenuation at attenuator 75 in the same manner described for the AGC circuit 74a in the subscriber terminal circuit STU1. The VF signal level is therefore stabilized in the same manner described for the subscribier terminal circuit STU1.

The operation of the remaining central office and subscriber channel terminal circuits COT2–COT8 and STU2–STU8 is the same as that just described for the terminal circuits COT1 and STU1.

Figure 4:
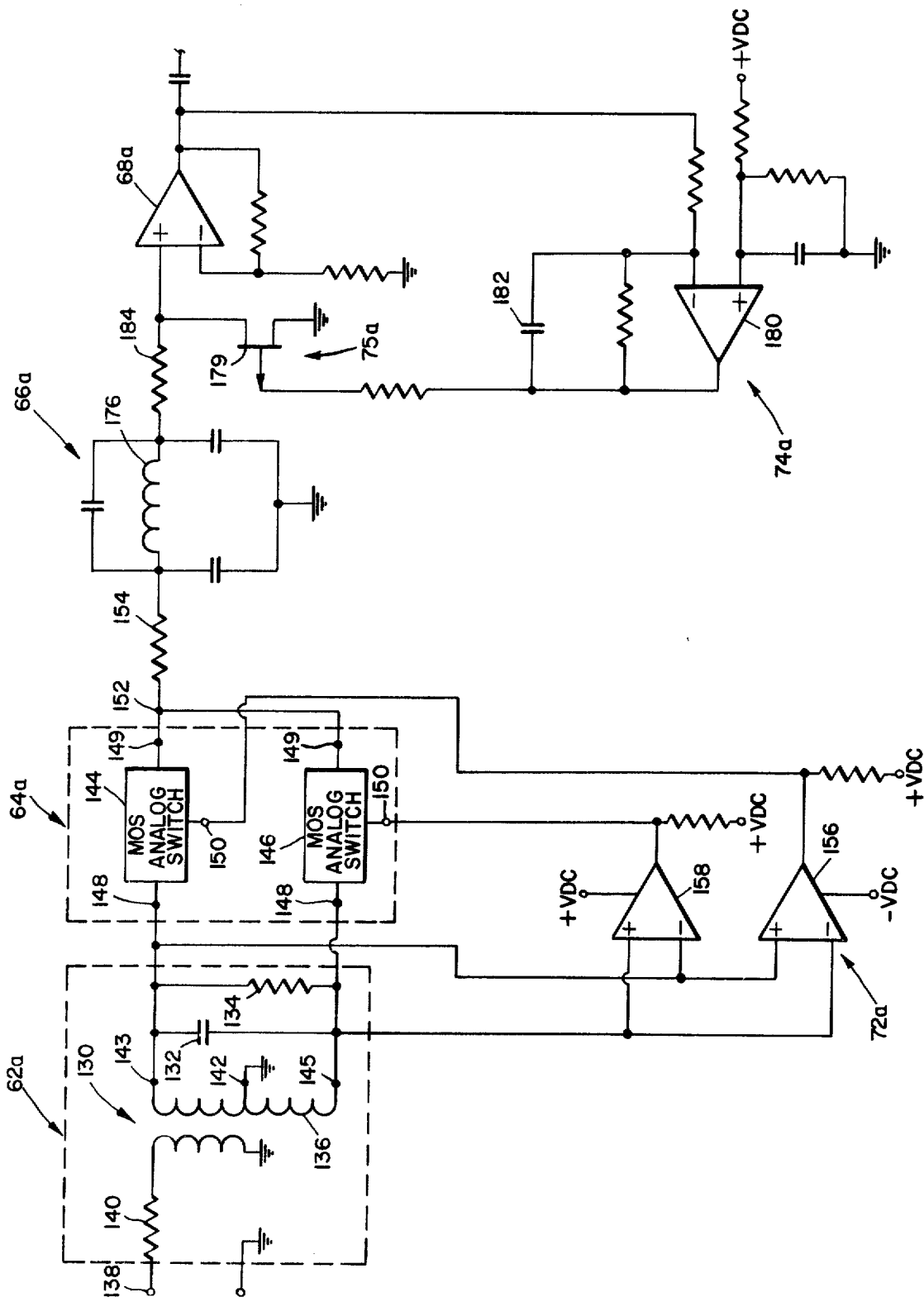
FIG. 4 is a schematic circuit diagram of a portion of the subscriber channel terminal circuit shown in FIG. 3.

In accordance with this invention the bandpass filter 62a in the subscriber channel terminal circuit has less than 3 poles or pole pairs and is advantageously a single pole or single pole pair filter as shown in FIG. 4. For purposes of this invention any suitable single pole bandpass filter can be employed.

However, the channel bandpass filter used in this invention is advantageously a parallel, single pole, LC resonant circuit as illustrated in FIG. 4. This resonant filter circuit design is preferred because it has a symmetrical response to provide equal attenuation for corresponding upper and lower side frequencies above and below the center frequency to which the resonant circuit is tuned. It is understood, however, that other LC resonant circuit configurations can be used. Also, an active bandpass filter could be used instead of the illustrated passive filter configuration.

Regarding the bandpass filter nomenclature, active and passive bandpass filters are commonly referred to as an n pole bandpass filter or an n pole pair bandpass filter and also, sometimes, as an n order bandpass filter, wherein n is some interger that is determined by the filter circuit design. All three of these bandpass filter designations are considered to be the equivalent of one another and may be used interchangeably to identify the same filter. Thus, filter 62a may be identified as a single pole pair bandpass filter, a one pole bandpass filter, or a first order bandpass filter.

In this embodiment, the filter 62a is shown in FIG. 4 to comprise a step-up transformer 130 and a capacitor 132. A resistor 134 establishes the terminating resistance for the filter and has the effect of setting the Q of the filter's parallel resonant circuit along with the inductive reactance of the transformer's secondary coil 136. The single pole pair of filter 62a is established by capacitor 132 and the transformer's secondary coil 136. As shown, capacitor 132 is connected across coil 136 in the secondary of transformer 130.

The values of capacitor 132 and coil 136 are selected so that the parallel resonant circuit is tuned to the desired incoming carrier frequency (e.g., 88 kHz for subscriber terminal circuit STU1). This resonant circuit provides a single peak response curve typical of an ordinary tank circuit response.

The signal source supplying the incoming carrier signal composite is across an input terminal 138 and ground so that the incoming carrier signal composite is coupled into the primary of transformer 130 through a resistor 140. The selected carrier signal at the resonant frequency is coupled by transformer 130 to the synchronous detector 64a and also to the zero crossover detector 72a.

As shown, the transformer's secondary coil 136 is center tapped to earth ground at 142 to provide two induced carrier signal voltages that are 180° out of phase with each other, one being developed across the upper secondary terminal 143 and center tap 142, and the other being developed across the lower secondary terminal 145 and center tap 142. The secondary carrier signal voltage at terminal 143 is indicated at 147 in FIG. 6, and the other secondary carrier signal voltage at terminal 145 is indicated at 149 in FIG. 6. The two out-of-phase carrier signal voltages are used to provide for full wave rectification as will be explained in greater detail shortly.

The synchronous detector 64a comprises at least one and preferably two switching devices which are cyclically switched on and off by the synchronous switching signal from the zero crossover detector 72a to detect the received carrier signal. Any suitable switching device may be used for this purpose.

In the illustrated embodiment, for example, a pair of MOS analog switches 144 and 146 are employed in detector 64a to provide a full wave rectification of the received carrier signal. Alternatively, field effect transistors may be used in place of the illustrated analog switches. Furthermore, only one switch may be used in place of the two shown to provide for the half wave rectification of the received carrier signal. Full wave rectification, however, is preferred and provides improved performance.

As shown in FIG. 4, each of the analog switches 144 and 146 has an input electrode 148, and an output electrode 149 and a control electrode 150. The output electrodes of switches 144 and 146 are connected to a common junction 152 which feeds the low pass filter 66a by way of a resistor 154. Switch 144 is serially connected in the signal current path between the terminal 143 of transformer coil 136 and junction 152. Switch 146 is similarly serially connected in the signal current path between the secondary terminal 145 and junction 152 as shown.

In the illustrated embodiment the zero crossover detector 72a comprises a pair of comparators 156 and 158. The outputs of comparators 156 and 158 are respectively connected to the control electrodes of switches 144 and 146 so that comparator 156 individually controls switch 144 and comparator 158 individually controls switch 146.

Still referring to FIG. 4, the non-inverting input terminal of comparator 158 is connected to terminal 145 of the transformer secondary coil 136, and the inverting input terminal of comparator 158 is connected to terminal 143 of coil 136. The connections for the input terminals of comparator 156 to terminals 143 and 145 are reversed from that just described for comparator 158.

By the foregoing circuit connections the received carrier signal is applied to both of the comparators 156 and 158. However, the carrier signal voltage at the input of comparator 156 will be 180° out of phase with the carrier signal voltage at the input of comparator 158 due to the phase relationship of carrier signal voltages that are established at the transformer secondary terminals 143 and 145 by the grounded center tap 142.

Each of the comparators 156 and 158 is non-inverting. This means that the output of each comparator will have the same polarity as the signal voltage at the comparator's non-inverting input. As long as the carrier signal voltage at the non-inverting input for each of the comparators 156 and 158 remains positive, the comparator's output voltage will be positive at some preselected value. When the carrier signal voltage at the comparator's non-inverting terminal crosses over zero volts and begins to swing negative, the comparator's output voltage switches sharply to a pre-selected negative value and remains at the negative value as long as the input signal voltage is negative. When the carrier signal input voltage begins to swing positive again, the comparator's output voltage switches back to its positive value.

Figure 6:
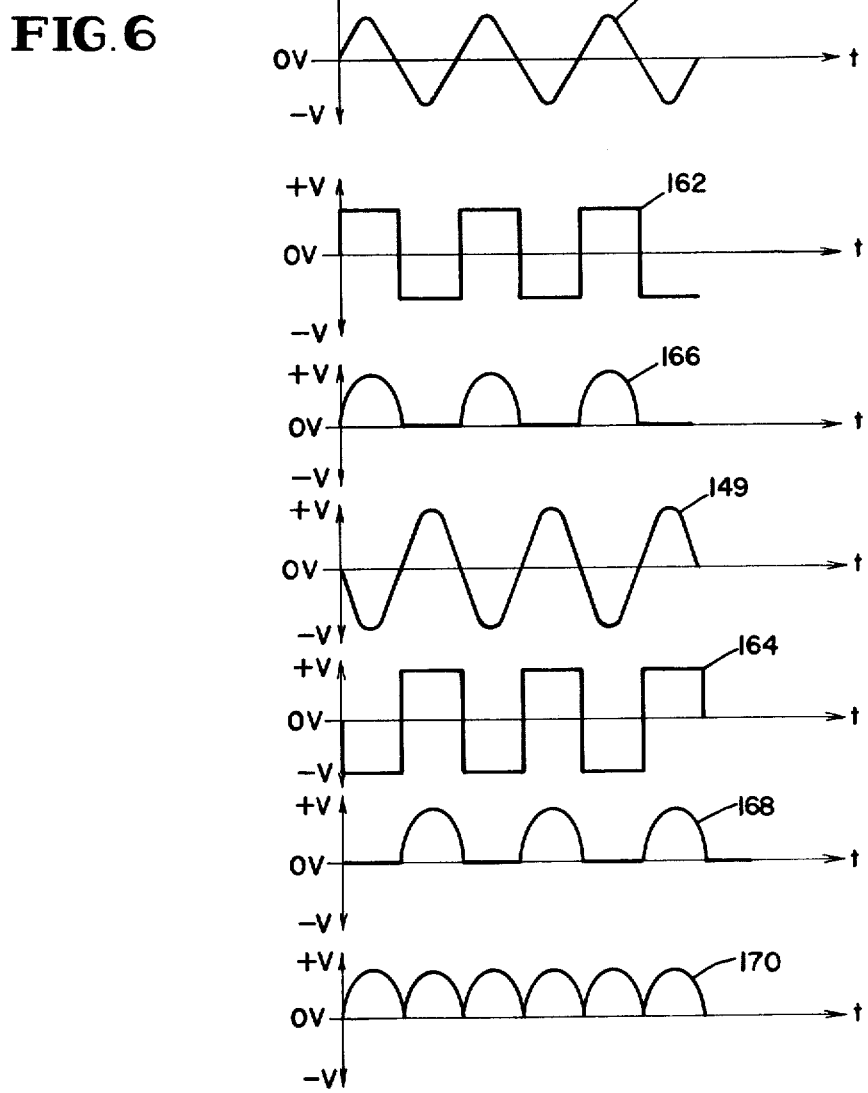
FIG. 6 is a timing diagram showing various waveforms for the receiver of this invention.

Each of the comparators 156 and 158 will therefore supply a square wave output voltage, the square wave output voltage for comparator 156 being indicated at 162 in FIG. 6, and the square wave output voltage for comparator 158 being indicated at 164 in FIG. 6. The combination of these square wave output signal voltages 162 and 164 represent the synchronous signal for driving the detector switches 144 and 146.

In the illustrated embodiment each of the detector switches 144 and 146 will be switched on to conduct current when the synchronizing switching signal voltage at its control electrode is positive at a predetermined value. Each of the switched 144 and 146 will turn off to interrupt the flow of current between its input and output electrodes when the switching voltage on its control electrode becomes negative.

As a result, switch 144 will be alternately turned on and off by the switching signal voltage at the output of comparator 156. Likewise, switch 146 will also be alternately turned on and off by the switching signal voltage at the output of comparator 158.

As shown in FIG. 6, the switching signal voltage 162 at the output of comparator 156 will be matched in phase and frequency with the carrier signal voltage at the secondary terminal 143. This carrier signal voltage will therefore be synchronously detected and hence rectified by switch 144 to provide the half wave rectified carrier signal voltage 166 (see FIG. 6) at the output electrode of switch 144.

Similarly, the switching signal voltage 164 at the output of comparator 158 will be matched in phase and frequency with the carrier signal voltage at the transformer secondary terminal 145. This carrier signal voltage will therefore be synchronously detected by switch 146 to provide the half wave rectified carrier signal voltage 168 (see FIG. 6) at the output electrode of switch 146.

Since the switching signals 162 and 164 are 180° out of phase with each other, switch 144 will be on when switch 146 is off and vise versa. The half-wave rectified voltages 166 and 168 will therefore be 180° out of phase with each other. They consequently combine at junction 152 to produce the desired full wave rectified signal voltage as indicated at 170 in FIG. 6.

In addition to establishing full wave rectification the dual switch arrangement in the synchronous detector 64a is advantageous because it has the effect of cancelling objectionable transient spikes that may occur in complementary fashion in the course of turning switches 144 and 146 on and off.

Because of the attenuation caused by the bandpass filter 62a and because of the frequencies that result from the synchronous demodulation of the incoming carrier, the low pass filter 66a may be of the single coil, third order elliptic type shown in FIG. 4 without creating noise problems. The single coil in filter 66a is indicated at 176 and is used for peaking in the 1 kHz to 3 kHz range to compensate for the attenuation that the side frequencies of the received carrier signal undergo in the single pole bandpass filter 62a. The peaking established by coil 176 complements the rolloff in the single pole bandpass filter 62a to make the overall VF frequency response of the receiver flat up to 300 Hz which is the cutoff for filter 66a. Filter 66a additionally smooths the rectified carrier signal pulses to provide the d.c. voltage component that is used by the AGC circuit 74a to establish the desired gain control of the audio signals.

The attenuator 75a and the AGC circuit 74a may be of any suitable circuit design. The one shown in FIG. 4, however, is advantageous because of its low cost.

In the illustrated example, attenuator 75a is an FET (field effect transistor) 179, and circuit 74a comprises a comparator 180 and a feedback capacitor 182 for filtering off the a.c. components, leaving the desired d.c. voltage component at the input of comparator 180 where it is compared against a fixed d.c. reference voltage. The output of comparator 180 represents the AGC voltage and varies with the difference between the level-indicating d.c. voltage component and the fixed reference voltage.

The AGC voltage at the output of comparator 180 is applied to the gate of FET 179 to control the FET's impedance between its drain and source terminals. As shown, FET 179 has its drain and source connected between the non-inverting input of amplifier 68a and earth ground to establish a variable resistance shunt across the amplifier's input for bypassing a variable portion of the incoming signal to ground. The variable drain-source resistance of FET 179 is determined by the magnitude of the AGC voltage at the output of comparator 180 and develops a voltage divider effect with the amplifier input resistor 184 which is connected in the signal path between filter 66a and the non-inverting input of amplifier 68a. By controlling the drain-source resistance of FET 179, the AGC voltage controls the level of the signal voltage at the non-inverting input of amplifier 68a.

In addition to the order of bandpass filter 62a, the sharpness of the filter's resonant response curve requires consideration. If the response curve is very sharp to achieve high selectivity, the side frequencies of the received carrier signal will be greatly attenuated by widely varying amounts, requiring complex and costly equalization circuitry for developing a flat VF response in the audio portion of the communication receiver. On the other hand, if the bandpass filter's response curve is not made sharp enough and is relatively broad, two other troublesome conditions occur.

First, there will be insufficient attenuation of the carrier and side frequencies from the adjacent channels, thus leading to objectionably high levels of crosstalk in the audio portion of the receiver unless a much more expensive and complex low pass filter is used with a fast rolloff. It was also found that a relatively broad response curve causes phase jitter in the switching signal voltages at the outputs of comparators 156 and 158. The phase jitter leads to two additional problems.

First, it causes objectionable variations in the d.c. voltage component which is produced by the synchronous detection of the desired carrier signal and which is used in the AGC circuit 74a to obtain the AGC action in the VF portion of the receiver. If large enough, these variations in the d.c. voltage component have the effect of causing unacceptable AGC action in the VF portion of the receiver.

Furthermore, it was found that the above-mentioned phase jitter in the comparators' switching signal voltages (indicated at 162 and 164 in FIG. 6) causes a certain amount of the unwanted frequency components from adjacent channels to be synchronously detected. The synchronous detection of these unwanted frequencies creates in-band (i.e., 300 to 3000 Hz) crosstalk in the receiving channel. This crosstalk is particularly troublesome because it is within the low pass filter's passband and is therefore transmitted without attenuation to the subscriber's telephone.

In the present invention the foregoing problem of inadequate selectivity and phase jitter are satisfactorily overcome by designing the bandpass filter's resonant circuit with selected LC values which cause the unwanted carrier signals in the adjacent channels to be attenuated to a level that is at least approximately 13 db below the level of the received carrier frequency to which the bandpass resonant circuit is tuned.

To achieve satisfactorily flat VF response in the 300 Hz to 3000 Hz range with the single coil low pass filter 66a, it was found that the side frequencies of the received carrier signal,—particularly the upper and lower 3 kHz side frequencies—could not tolerate an attenuation of more than approximately 6 db at the bandpass filter (i.e., attenuation of the modulating intelligence signal by an amount not exceeding 6 db more than the received carrier frequency is attenuated.

If the LC values in filter 62a are selected to attenuate the 3 kHz side frequencies by the maximum of 6 db, the carrier signals in the adjacent channels will be attenuated to a level that is about 15 db down from the level of the received carrier signal for the customary 8 kHz spacing between adjacent carrier frequencies. For satisfactorily overcoming all of the troublesome conditions mentioned above (i.e., the flatness of the response, the selectivity and the phase jitter) without resorting to a more complex low pass filter or to additional equalization circuitry, the sharpness of the bandpass filter's response curve can therefore be characterized as one that attenuates the adjacent carrier frequencies by an amount in the range extending from about 13 db to about 15 db. Preferably, the LC values of the resonant circuit in filter 62a are selected to attenuate the adjacent carrier signals (i.e., the carrier signals in the adjacent channels) to a level that is 15 db down from the level of the received carrier signal to which the resonant circuit is tuned. In this manner, the phase jitter is minimized to an extent that it does not present any real problem, and the bandpass filter's selectivity is maximized to achieve adequate attenuation of frequencies from adjacent channels without unduly attenuating the side frequencies of the received carrier signal.

The combined effect of the first order bandpass filter 62a and the synchronous detector 64a of this invention has the unique effect of reducing the crosstalk power levels in the audio portion of the receiver to values that are significantly less than maximum levels permitted under REA (Rural Electrification Administration) specifications. In this regard, the unwanted frequency component normally presenting the greatest crosstalk problem from an adjacent channel will be the closest one to the desired carrier signal because it will be attenuated the least by the bandpass and low pass filtering in the receiving channel. The closest unwanted frequency component will be the 3 kHz side frequency in each adjacent channel and will be spaced 5 kHz from the received carrier signal for the customary 8 kHz frequency spacing between adjacent carrier signals.

Considering reception of the 104 kHz carrier on channel 1 at the subscriber terminal circuit STU1, the closest unwanted frequency component will be at 109 kHz. This 109 kHz frequency component passes through the channel 1 bandpass filter 62a where its level is reduced or attenuated only by approximately 12 db for the preferred sharpness on the response curve. This amount of bandpass attenuation of the 109 kHz component would not be enough to keep crosstalk down to an acceptable level under REA standards if an envelope detector were used in place of the synchronous detector 64a.

In this invention, however, the synchronous detector 64a demodulates the 109 kHz component as a 5 kHz component rather than a 3 kHz component as is the case with an envelope detector, and the unwanted 5 kHz component will undergo additional attenuation at low pass filter 66a, being significantly above the low pass filter's 3000 Hz cutoff. In the present invention, therefore, the unwanted 109 kHz component undergoes 12 db attenuation at the bandpass filter 62a and the resulting 5 kHz detection component undergoes an additional 30 db attenuation at the low pass filter 66a, bringing the aggregate bandpass and low pass filter attenuation to −42 db. When this −42 db loss is taken together with all of the other losses (which amount to about 53 db) the 5 kHz detection component at the output of expandor 70a, as well as all of the other crosstalk components, will be significantly below the maximum crosstalk power levels permitted under REA specifications, namely +10 BrnC (which is −80 db down from the desired received signal at odbm) for intelligable crosstalk and +20 dBrnC for non-intelligable crosstalk.

With the possible exception of the channel bandpass filter configuration, the detailed circuit design for the receivers in the central office terminal circuits COT-1–COT8 is advantageously the same as that just described for the subscriber terminal circuit STU1. Depending upon the particular design of the station carrier system, however, it may in some instances be desirable to make the central office bandpass filter a second order filter rather than a first order filter.

For example, a second order channel bandpass filter may be preferred for the central office receiver equipment in a carrier system which provides subscriber-to-central office signalling by turning the subscriber-transmitted carrier signal on and off. According to this mode of signalling, the subscriber channel terminal circuit (STU1-STU8) will inhibit the transmission of the subscriber-to-central office carrier signal when the subscriber's telephone is on-hook and will effect transmission of the subscriber-to-central office carrier signal upon sensing the transfer of the subscriber's telephone to its off-hook state, thus signalling the central office that the subscriber's telephone has come off-hook. In such a signalling operation, the subscriber-to-central office carrier signal in one channel could busy one or both adjacent channels if it were not adequately attenuated by the bandpass filtering in the adjacent channels. To avoid this undesirable condition with a greater margin of safety, it is desirable to provide the central office channel bandpass filter 62 with an additional pole pair, thus making it a second order filter. One suitable second order configuration for filter 62 is shown in FIG. 5.

Figure 5:
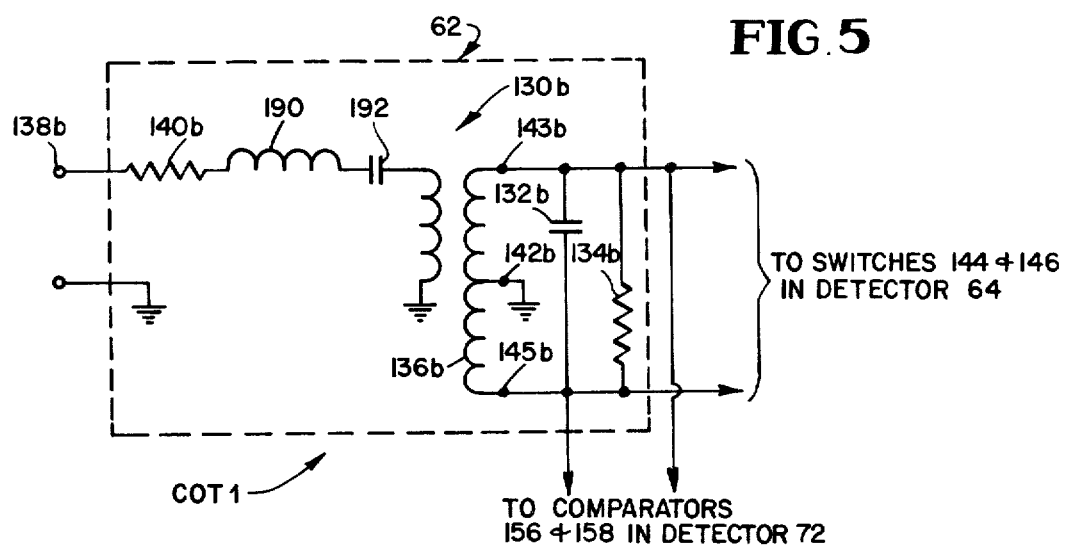
FIG. 5 is a schematic circuit diagram of a portion of the central office channel terminal circuit shown in FIG. 2.

As shown in FIG. 5, filter 62 is the same as filter 62a except that a second coil 190 and a second capacitor 192 have been added to define the filter's second pole. To the extent that filters 62 and 62a are alike, like reference numerals have been applied to designate like components, except that the reference characters used for filters 62 have been suffixed by the letter "b" to distinguish them from the reference numerals used for filter 62a.

Coil 190 and capacitor 192 are connected in series in the primary of transformer 130b to form a series resonant circuit which is tuned to the carrier frequency to be received.

The circuitry for the synchronous detector 64, the zero crossover detector 72, the low pass filter 66, and AGC circuit 74 and the attenuator 75 are all the same as that shown in FIG. 4 and previously described for the subscriber channel terminal circuit.

The AGC circuit 110 in the subscriber group terminal unit 36 may be of any suitable circuit design for developing an AGC current or voltage that varies as a function of the composite voltage of incoming carrier signals arriving from the central office terminal equipment and hence as a function of the length of transmission 22 between its terminal points. One example of a suitable design for circuit 110 is shown in FIG. 7 to comprise a half wave averaging detector 200 for rectifying the composite carrier signal voltage, a filter 202 for filtering the resulting half wave rectification out of detector 200 to produce a d.c. voltage which is indicative of the average value of the rectified signal, and a comparator 204 for comparing the average voltage with a fixed d.c. reference potential to establish an AGC signal that varies with the difference between the above-mentioned d.c. voltage and the reference potential.

Figure 7:
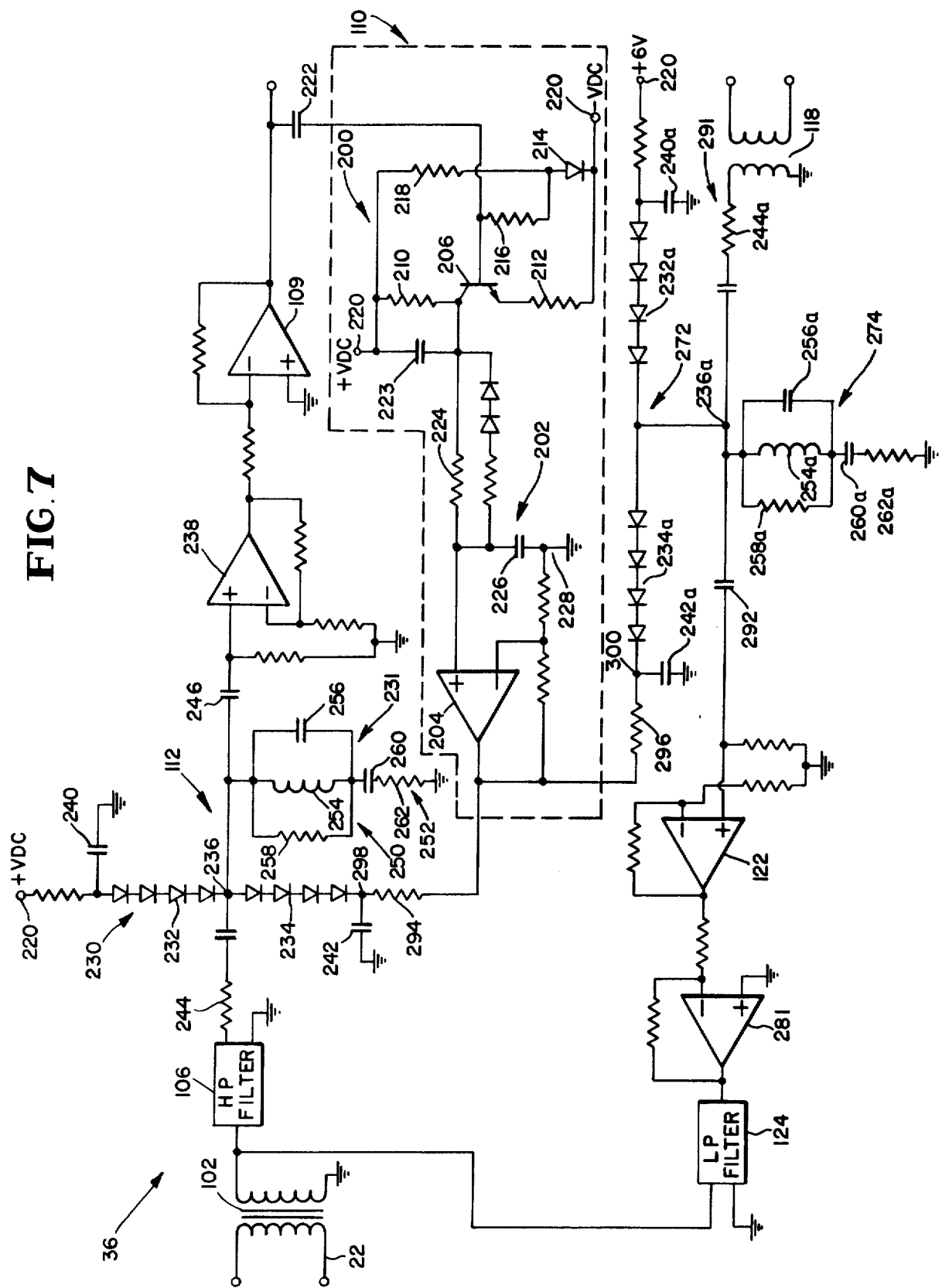
FIG. 7 is a schematic circuit diagram of a portion of the subscriber group terminal unit shown in FIG. 3.

As shown in FIG. 7, detector 200 includes an NPN transistor 206 whose gain is set by a collector resistor 210 and an emitter resistor 212. For biasing transistor 206, a diode 214 is connected between the junction of two resistors 216 and 218 and the negative terminal of a suitable d.c. voltage supply source 220. Resistors 216 and 218 are connected in series between the positive terminal of source 220 and the base of transistor 206. Resistor 216 is relatively small, and diode 206 thus sets the base biasing voltage of transistor 206 at about +0.6 VDC so that in absence of an a.c. signal voltage at the base of transistor 206, the transistor is on the verge of turning on.

The composite of the incoming carrier signals at the output of aomplifier 109 is coupled by a capacitor 222 to the base of transistor 206. Transistor 206 will be driven into conduction only by the positive alternations of the applied carrier signal composite. The transistor's collector voltage will therefore be driven negatively on the positive alternations of the composite carrier signal to establish the half-wave rectification of the composite carrier signal.

Filter 202 includes a capacitor 223 and an RC network comprising a resistor 224 and an additional capacitor 226 for filtering the half wave rectified voltage. The smoothed-out d.c. voltage is indicative of the average value of the half wave rectified composite carrier signal and is applied to the positive input of comparator 204. Comparator 204 compares the d.c. average voltage with the fixed AGC reference which is at ground potential as indicated at 228.

Still referring to FIG. 7, the level adjusting circuit 112 comprises two signal attenuators 230 and 231, the former being frequency independent and connected to comparator 204 to provide an AGC adjustment, and the latter being frequency dependent to establish a slope equalizing adjustment. In the illustrated embodiment attenuator 230 comprises two diode strings 232 and 234 connected in series between the positive terminal of the voltage source 220 and the output of comparator 204. Each diode string has a plurality of diodes (e.g., four diodes in this embodiment) connected in series with each other.

As shown, the adjacent terminals of diode strings 232 and 234 are interconnected by a common junction 236 at the carrier signal path between filter 106 and the fixed gain amplification circuitry in the receive section of unit 36. In the illustrated embodiment an additional fixed gain amplifier 109 may be connected serially between the output and amplifier 238 to provide additional amplification of the composite carrier signal following level adjustment of the incoming carrier signals by the level-adjusting circuit 112.

As shown, the terminals of diode strings 232 and 34 remote from the common junction 236 are connected to ground by relatively large capacitors 240 and 242 and are therefore at a.c. ground. For a.c. signals diode strings 232 and 234 are therefore effectively connected in parallel between junction 236 and a.c. ground for shunting a variable portion of the incoming composite carrier signal to ground. This a.c. signal circuit is such that the parallel combination of diode strings 232 and 234 cooperates with a resistor 244 to establish a voltage divider for dividing down the incoming carrier signal composite by an amount depending upon the current-dependent impedances of the diodes in strings 232 and 234. The a.c. signal output voltage from this voltage divider is developed at junction 236 and is coupled by a d.c. blocking capacitor 246 to the input of amplifier 238 for fixed gain amplification.

If the variable impedance of the parallel combination of diode strings 232 and 234 is represented by Z and the resistance of resistor 244 is represented by R then the a.c. divider output voltage will be proportional to Z divided by the sum of Z and R. In this way the a.c. voltage divider action established by resistor 244 and the two diode strings divides down the incoming carrier signal composite at the input end of resistor 244 to a value that is determined by the diode impedances in strings 232 and 234. In effect, the amount of carrier signal current shunted to ground through strings 232 and 234 and thus bypassing amplifier 238 will vary inversely with the current-dependent impedances of the diodes in strings 232 and 234.

The impedances of diode strings 232 and 234 are determined by the direct current drawn from the positive terminal of source 220. The amount of direct current drawn from source 220 in turn is determined by the extent to which the diodes in strings 232 and 234 are forward biased by the voltage at the output of comparator 204.

When the carrier signal composite is applied to transistor 206 to initiate the AGC action, capacitor 226 starts charging toward ground potential from some positive value at its upper plate and hence at the positive input of comparator 204. When capacitor 226 pulls the positive input of comparator 204 to a value approaching zero volts, the output voltage of comparator 204 will begin to switch in a negative direction from the supply voltage (e.g., 6VDC) and will continue decreasing to a predetermined value that forward biases the diodes in strings 232 and 234.

The diodes in strings 232 and 234 therefore conduct, and the amount of direct current drawn through the diodes will vary as a function of the voltage at the output of comparator 204. In particular, the amount of direct current conducted serially through the diode strings 232 and 234 will increase as the voltage at the output of comparator 204 becomes more negative with respect to the positive supply voltage furnished by source 220.

The impedance of the diodes in strings 232 and 234 varies inversely with respect to the amount of direct current conducted through the diodes. Thus, the impedance of diode strings 232 and 234 decreases as the voltage at the output of comparator 204 becomes more negative with respect to the supply voltage 220.

Due to the voltage divider effect of diode strings 232 and 234 with resistor 244, the level of the incoming carrier signal composite at junction 236 will therefore be decreased as the direct current through diode strings 232 and 234 is increased. The amount of direct current drawn through diode strings 232 and 234 will continue to increase under the control of the AGC circuit 110 until the voltage at the positive input of comparator 204 approaches the fixed reference potential which in this case is zero volts.

The voltage at the positive input of comparator 204 will therefore continue to decrease until it reaches a value at which the AGC loop stablizes. When this happens, the amount of direct current drawn through the diode strings 232 and 234 will stabilize at a predetermined value for a given input level of the carrier signal composite, and the level of the carrier signal composite at junction 236 will therefore stabilize at a predetermined value for all values of carrier composite input level to resistor 244. The action of AGC circuit 110 thus has the effect of continuously attempting to drive the voltage at the positive input of comparator 204 to a value equal or approaching the fixed AGC reference potential. In this way each of the incoming carrier signals in the composite waveform at junction 235 will be adjusted by AGC circuit 110 to predetermined value which does not change regardless of the length of transmission line 22 up to some predetermined maximum length.

The direct current that AGC circuit 110 draws through diode strings 232 and 234 will vary proportionately with the level (peak amplitude) of the composite carrier signal that is applied to input of circuit 110 at the base of transistor 206. The extent of carrier signal attenuation by diode strings 232 and 234 will therefore vary with the composite carrier level at the input of circuit 110. Preferably, the impedances of diode strings 232 and 234 are equal.

In the illustrated embodiment, the central office-to-subscriber carrier signals will be transmitted continuously from the central office terminal circuits COT-1–COT8 at a common level. This is a simplified way of coordinating the levels of central office transmitted carrier signal in the carrier system shown in FIG. 1 with the levels of central office-transmitted carrier signals in one or more other carrier systems having their transmission lines in the same cable containing line 22.

Because of their different frequencies (i.e., 104 kHz to 160 kHz) these central office-transmitted carrier signals will be attenuated by different amounts by transmission over the transmission line 22 and will consequently arrive at the subscriber group terminal unit 36 at different levels, the higher frequency carrier signals being attenuated more than the lower frequency carrier signals as is well known.

The diode string attenuator 230 alone will not provide correction for these differences in the levels of the carrier signals arriving from the central office. Thus, if no further corrective adjustments were made in the levels of the carrier signals arriving from the central office, the lower frequency carriers would be significantly stronger than the higher frequency carriers. This condition could be troublesome because of the use of the first order channel bandpass filters 62a in the subscriber terminal circuits STU1-STU8. In this regard the levels of the lower frequency carrier signal may not be attenuated sufficiently in the higher frequency channels (e.g., channel 8 at 160 kHz) to avoid a crosstalk problem in the subscriber receivers for the higher frequency channels.

To avoid the occurrence of this potentially troublesome condition, the frequency dependent attenuator 231 cooperates with attenuator 230 to adjust the incoming carrier signals to or at least approximately to a common value to thereby provide correction for the cable slope (i.e., the differences in attenuation due to transmission of the central office-transmitted carrier signals over line 22).

As shown in FIG. 7, the frequency dependent attenuator 231 advantageously comprises a parallel resonant circuit 250 and a series resonant circuit 252. Circuits 250 and 252 are connected between junction 236 and ground.

In the illustrated embodiment a single coil 254 is common to both the parallel resonant circuit 250 and the series resonant circuit 252. Thus, the parallel resonant circuit is defined by coil 254, a capacitor 256 and a shunt resistor 258 all connected in parallel. The series resonant circuit is defined by coil 254, a further capacitor 260 and a resistor 262 all connected in series as shown.

Attenuator 231 cooperates with resistor 244 to establish a voltage divider for dividing down each of the incoming carrier signals as a function of its own carrier frequency. The parallel resonant circuit 250 is preferably tuned to a frequency somewhat higher than the highest carrier frequency (144 kHz) transmitted down transmission line 22 from the central office channel terminal equipment. The series resonant circuit 252, on the other hand, is preferably tuned to a frequency somewhat lower than the lowest carrier frequency (88 kHz) that is transmitted down line 22 from the central office terminal equipment.

The response of circuit 252 is in the form of a notch at resonance since circuit 252 is in parallel with the input carrier signal source. On the other hand, the response of the parallel resonant circuit 250 is in the form of a peak. With the selection of the series and parallel resonant frequencies as indicated above to bracket the central office-transmitted carrier frequencies, the central office-transmitted carrier frequencies will all fall on one side or skirt of the overall frequency response curve between the parallel resonant peak and the series resonant notch and preferably in the overall response curve region having a substantially uniform slope.

As is known, the frequency-dependent impedance of the parallel resonant circuit 250 increases to maximum at the parallel circuit's resonant frequency, while the frequency-dependent impedance of the series resonant circuit 242 decreases to a minimum at the series circuit's resonant frequency. Thus, the overall frequency-dependent impedance of attenuator 231 varies with frequency and increases from a low value at the lowest of the incoming carrier frequencies to a relatively high value at the highest incoming carrier frequencies. The higher carrier frequencies will therefore be attenuated less than the lower carrier frequencies to compensate for the frequency-dependent attenuation that the carrier signals undergo by transmission over transmission line 22.

It will be noted that the parallel a.c. circuit combination of diode strings 232 and 234 acts as a shunt resistance across the parallel resonant circuit 240 to load the parallel resonant circuit. Variations in the shunt resistance established by diode strings 232 and 234 thus varies the circuit Q of the parallel resonant circuit. As this shunt resistance decreases, the Q of parallel resonant circuit 250 decreases to make the parallel resonant response curve broader (i.e., less sharp). Conversely, the circuit Q will increase and the response curve will become sharper as the shunt resistance increases.

Thus, the change in the shunt resistance will have the effect of changing the slope of the resonant response curve in the frequency range covering the central office-transmitted frequencies.

For relatively short transmission line lengths, the shunt resistance established by diode strings 232 and 234 will be decreased. The slope of the resonant response curve's skirt will therefore decrease in the frequency band containing the incoming carrier frequencies, thus reducing the differences in attenuation between the different carrier frequencies. In other words, the difference in attenuation between the highest and lowest of the incoming carrier frequencies will be decreased to account for the decreased cable slope. Attenuator 231 therefore will have less slope correcting effect upon the incoming carriers as the transmission line is made shorter.

Conversely, the diode string shunt resistance will be increased for longer transmission line lengths, thus increasing the slope of the overall response in the frequency band covering the central office transmitted carrier frequencies. As a result, the differences in attenuation for the different carrier frequencies will increase to compensate for the increased cable slope.

In this manner attenuator 231 and the diode string shunt resistance combine to have the effect of attenuating all of the incoming carrier signals to or approximately to a common level regardless of the length of the transmission line up to a predetermined maximum limit. The level adjusting circuit 112 therefore provides the desired slope correction to achieve a flat carrier frequency response for any transmission line length within the circuit's operating capability.

As a result, all of the carrier signals arriving at the bandpass filters 62a in the subscriber terminal circuits STU1-STU8 will be at or approximately at a common level. Thus, no one carrier signal will be significantly stronger than another to cause objectionable interference in the receivers of neighboring channels.

The automatic coordination control circuit 120 is used to minimize inter-system crosstalk or interference between carrier signals of like frequencies in two or more carrier systems which have their transmission lines in the same cable or in otherwise close proximity to each other. In this regard it is common practice to connect two or more carrier systems to the same central office and to place the separate transmission lines for the carrier systems in the same cable so that portions of the transmission lines extend coextensively from the central office.

The lengths of these transmission lines, rather than being equal, are quite often different, with one line extending a greater distance away from the central office than another. If the power levels for carrier signals of like frequencies on the separate transmission lines are not adjusted to be approximately equal at any given point along the coextensive portions of the lines in the common cable, objectionable crosstalk will occur between the carrier systems. An example of a plural carrier system facility or installation in which inter-system crosstalk can occur is shown in FIG. 8.

In FIG. 8, the previously described carrier system 20 and one additional station carrier system 20' are shown to be both connected to the same central office. Carrier system 20' for purposes of this example may be of the same design as carrier system 20. Accordingly, like reference characters have been applied to designate corresponding parts of systems 20 and 20' except that the reference characters for system 20' have been primed to distinguish them from the reference numerals used for identifying the parts of system 20.

As shown in FIG. 8, the transmission lines 22 and 22' of the two carrier systems having portions extending coextensively from the central office in a common cable 270. Transmission line 22' is longer than transmission lines 22 so that the cable slope for line 22' will be greater than that for line 22. Assuming the same carrier frequency allocation scheme for both systems, the carrier frequencies transmitted over line 22 will correspond to the carrier frequencies that are transmitted over line 22'.

The inter-system crosstalk problem for the central office-transmitted carrier signals is avoided by simply transmitting all of the central office carrier signals from the central office terminal equipment in both systems at a common level. The automatic coordination control circuit 120 in system 20 and its counterpart circuit 120' (not shown) in system 20' are used to avoid the crosstalk problem for the carrier signals that are transmitted in the opposite direction from the subscriber terminal equipment to the central office. This is done by coordinating the adjustment of the subscriber transmit carrier signal levels in such a way that regardless of any difference between the lengths of transmission lines 22 and 22' the power of carrier signals of like frequencies on the different transmission lines will be at least approximately the same at any point along the complete cable or the coextensive portions of the transmission lines.

The expression "automatic carrier level coordination control" is therefore understood to mean that at any point along coextensive portions of two or more separate transmission paths or transmission lines for different carrier systems in a common installation, the power levels of the carrier signals of common or like frequency will automatically be at least approximately equal, regardless of any differences in the lengths of the transmission lines in the installation and for any transmission line lengths within the operating range of the automatic coordination control system or circuitry.

To automatically accomplish this adjustment, the automatic coordination control circuit 120 is shown in the illustrated embodiment to comprise two carrier signal attenuations 272 and 274. The circuit configuration of attenuators 272 and 274 are advantageously the same as attenuators 230 and 231, respectively. Accordingly, like reference numerals have been applied to designate corresponding components of attenuators 272 and 230 except that the reference numerals applied to attenuator 272 have been suffixed with the letter a to distinguish them from the reference numerals used for attenuator 230. Likewise, like reference numerals have been used to designate corresponding components of attenuators 274 and 231 except that the reference characters for attenuator 274 have been suffixed by the letter a to distinguish them from the reference numerals used for attenuator 231.

As described in detail below, attenuator 272 is a frequency independent network and adjusts the level of the outgoing subscriber carrier signal composite as a function of the length of the transmission line 22 between its termination points. Attenuator 274, on the other hand, is frequency dependent and makes a slope adjustment to compensate for the different attenuations that the subscriber carrier signals will undergo due to their different frequencies.

As shown in FIG. 7, the diode strings 232a and 234a in attenuator 272 are connected in series between the output of comparator 204 and the positive terminal of the d.c. voltage source 220. The common junction between diode strings 232a and 234a is indicated at 236a and is connected in the carrier signal path between transformer 118 and the fixed gain amplifier circuitry which may include further fixed gain amplifier 281 in addition to amplifier 122.

Similar to the circuit design and operation described for diode strings 232 and 234, diode strings 232a and 234a are effectively in parallel for a.c. signals and shunt a variable portion of the outgoing subscriber carrier signal composite to ground. Resistor 244a and the a.c. parallel combination established by diode strings 232a and 234a form a voltage divider 291 which acts in the samer manner as the voltage divider that is formed by resistor 244 and diode strings 232 and 234.

The output voltage from divider 291 is developed at junction 236a, is coupled to amplifier 122 by a d.c. blocking capacitor 292 and will vary proportionately with the impedance of the diodes in strings 232a and 234a. The impedance of diode strings 232a and 234a will, in turn, vary inversely with the amount of direct current conducted through the diode strings, and the amount of direct current conducted through the diode strings will be varied by the voltage at the output of comparator 204.

Since the voltage at the output of comparator 204 varies proportionately with the length of transmission line 22 and is thereby a measure of the transmission line length, the direct current drawn through diode strings 232a and 234a will also vary proportionately with the transmission line length. The impedance of diode strings 232a and 234a therefore vary inversely with respect to the length of transmission line 22. Thus, the longer the transmission line becomes, the greater the composite carrier signal voltage at the output of voltage divider 291 and vice versa. The composite carrier signal voltage at the output of attenuator 230 will therefore vary with the transmission line length, there being less attenuation for long transmission lines and more attenuation for short lines.

The parallel resonant circuit 250a is preferably tuned to a frequency somewhat higher than the highest subscriber carrier frequency (64 kHz) that is transmitted over transmission line 22 to the central office terminal equipment. The series resonant circuit 252a is preferably tuned to a frequency somewhat lower than the lowest subscriber carrier frequency (8 kHz).

Like the parallel and series resonant circuits in attenuator 231, the response of the series resonant circuit 252a is in the form of a notch at resonance, while the resonant response of the parallel resonant circuit 250a is in the form of a peak. The band of subscriber carrier frequencies (8 kHz to 64 kHz) therefore lies on one side or skirt of the overall frequency response curve between the parallel resonant peak and the series resonant notch and preferably in the response curve region having a substantially uniform slope.

The frequency-dependent impedance of the parallel resonant circuit 250a increases to maximum at the parallel circuit's resonant frequency, while the frequency-dependent impedance of the series resonant circuit 252a decreases to a minimum at the series circuit's resonant frequency. The overall frequency-dependent impedance of attenuator 274 in the band of the subscriber carrier frequencies thus increases from a low value at the lowest of the subscriber carrier frequencies (8 kHz) to a relatively high value at the highest subscriber carrier frequencies (64 kHz). The higher subscriber carrier frequencies will therefore be attenuated less than the lower subscriber carrier frequencies to provide the slope correction that compensates for the frequency-dependent attenuation that the carrier signals undergo by transmission over transmission line 22.

Similar to the relationship of diode strings 232 and 234 to the resonant circuits 250 and 252, the parallel a.c. circuit combination of diode strings 232a and 234a acts as a shunt resistance across the parallel resonant circuit 250a to load the parallel resonant circuit. Variations in the shunt resistance established by diode strings 232a and 234a thus varies the circuit Q of the parallel resonant circuit. As thus shunt resistance decreases, the Q of parallel resonant circuit 250a decreases to decrease the sharpness of the parallel resonant response curve. Conversely, the circuit Q will increase and the response curve becomes sharper as the shunt resistance increases.

Thus, a change in the shunt resistance will have the effect of changing the slope of the overall resonant response curve in the frequency range covering the subscriber carrier frequencies.

For short transmission line lengths, the shunt resistance established by diode strings 232a and 234a will be decreased. The slope of the resonant response curve's skirt will therefore decrease in the frequency band containing the subscriber carrier frequencies, thus reducing the differences in attenuation between the different carrier frequencies. In other words, the difference in attenuation between the highest and lowest of the subscriber carrier frequencies will be decreased to account for the decreased cable slope. Attenuator 231a therefore will have less slope correcting effect upon the outgoing subscriber carriers as the transmission line is made shorter.

Conversely, the diode string shunt resistance will be increased for longer transmission line lengths, thus increasing the slope of the overall response in the frequency band covering the outgoing subscriber carrier frequencies. As a result, the differences in attenuation for the different subscriber carrier frequencies will increase to compensate for the increased cable slope.

In this manner attenuator 231a and the diode strings 232a and 234a combine to have the effect of attenuating each of the outgoing subscriber carrier signals as a function of its own carrier frequency and as a function of the length of transmission 22.

As previously explained the subscriber-transmitted carrier signals are in a frequency band that is lower than the frequency band containing the central office-transmission carrier signals. The subscriber-transmitted carrier signals therefore undergo less attenuation than the central office carrier signals. Because of this attenuation difference it is desirable to attenuate the outgoing subscriber carrier signal composite by an amount that is less than the attenuation that the incoming central carrier signal composite undergoes at attenuator 230. This difference in attenuation is achieved mainly by resistors 294 and 296.

As shown in FIG. 7, resistor 294 is connected in series with diode strings 232 and 234 between the circuit point or junction 298 and the output of comparator 204. Resistor 296, on the other hand, is connected in series with diode strings 232a and 234a between the circuit junction 300 and the output of comparator 204.

Because the voltage drop across the forward biased diodes in strings 232, 234, 232a and 234a will not be varied to any significant degree by changes in the amount of current flowing through the diodes strings, junctions 298 and 300 each act or appear as a voltage source. Likewise, the output of comparator 204 also appears as a voltage source. It also will be noted that the sum of the direct current conducted through attenuator 230 and the direct current conducted through attenuator 272 is equal to the output current of comparator 204.

Because of this and because the output of comparator 204 and circuit points 298 and 300 appear as voltage sources, the ratio of $I_1/I_2$ will be closely equal to the ratio of $R_2/R_1$ where $I_1$ is the amount of direct current conducted through diode strings 232a and 234a, $I_2$ is the amount of direct current conducted through diode strings 232 and 234, $R_1$ is resistance of resistor 300, and $R_2$ is the resistance of resistor 298.

Thus the ratio of $I_1/I_2$ may be set at a selected value less than unity by selecting the ratio of resistors 298 and 300 to compensate for the difference in overall attenuation between the high band of central office carrier frequencies and the low band of subscriber carrier frequencies.

From the foregoing discussion it will be appreciated that the coordination control circuit 120 adjusts the levels of the subscriber transmit carrier signals as a group under the control of the AGC circuit 110. The levels of each subscriber carrier signal is adjusted by circuit 120 as a function of its own carrier frequency and as a function of the transmission line length which may and usually does vary for different carrier system installations. Each subscriber transmit carrier signal will therefore be adjusted in accordance with the attenuation that it undergoes at its transmit frequency upon transmission over line 22. In this manner the subscriber carrier signals will arrive at the central office group terminal unit 34 or some other transmission line terminating point at pre-selected levels which remain the same regardless of the length of transmission line 22.

In the illustrated embodiment the preferred slope adjustment of the subscriber transmit carrier signals at circuit 120 causes all of the subscriber carrier signals to arrive at the central office group terminal unit 34 or other transmission line termination at or at least approximately at the same pre-selected level. As a result, no one of the subscriber transmit carrier signals arriving at the central office terminal equipment will be significantly stronger than any other subscriber carrier signal to cause objectionable interference in the receivers of neighboring channels at the central office channel terminal equipment.

When automatic carrier level coordination control is achieved by adjustment of the subscriber carrier transmit levels, it will be appreciated that at any given distance measured along transmission line 22 from the central office or other remote termination, the level of each subscriber transmit carrier signal remains at least approximately the same regardless of the transmission line length.

By equipping the subscriber group terminal 36' in carrier system 20' with the automatic coordination control circuitry (120' and 110') corresponding to the coordination control and AGC circuits 120 and 110 and by using equal AGC reference voltages in the two AGC circuits 110 and 110', then each pair of subscriber transmit carrier signals of the same frequency (one on line 22 and the other on line 22') will be at or at least approximately at the same level at any point along the coextensive portions of transmission lines 22 and 22' in cable 270.

The AGC attenuator 95 at the central office group terminal unit 34 does not perform any slope equalization function and is not required to adjust the strengths of the incoming carriers to a common level because this is effectively accomplished beforehand by the automatic coordination control circuit 120 at the subscriber group terminal 36.

The central office terminal circuits COT1–COT8 and the central office group terminal unit 34 may be centralized in a single card cage or card shelf at the central office and may be mounted on one or more circuit boards.

Additionally, the subscriber terminal circuits STU-1–STU8 and the subscriber group terminal unit 36 may be mounted on one or more circuit boards which are housed in a suitable card cage or card shelf to provide a single centralized subscriber terminal. With such an arrangement, subscriber drops will extend out from the subscriber terminal units to the telephone 40 wherever the telephones may be located.

If more than eight channels are needed at the single centralized subscriber terminal mentioned above, the carrier installation may be expanded by adding the required number of carrier systems. For example, if a 48 channel installation is desired then six carrier systems corresponding to carrier system 20 may be arranged together, and the subscriber channel terminal circuits and the subscriber group terminal units for all six carrier systems may be grouped together at a single centralized subscriber terminal. The central office channel terminal circuits and the central office group terminal units for the six carrier systems also may be grouped together at a single centralized terminal in the central office.

The use of the term "unit" in referring to the central office and subscriber group terminal units is considered to be the equivalent of and interchangeable with the term "circuit".

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent of the United States is:

1. A telephone carrier system communication receiver for receiving a pre-selected one of a plurality of incoming amplitude modulated carrier signals of different pre-selected frequencies in a plural channel frequency division multiplexed amplitude modulated telephone carrier system, comprising a pre-detection channel bandpass filter tuned to the frequency of said pre-selected one of said carrier signals for passing said pre-selected one of said incoming carrier signals, and means connected to said filter for synchronously detecting the amplitude modulated carrier signal to which said bandpass filter is tuned, the order of said bandpass filter being no greater than two.

2. The telephone carrier system communication receiver defined in claim 1 wherein said channel bandpass filter is a first order bandpass filter.

3. The telephone carrier system communication receiver defined in claim 1 wherein said bandpass filter is a second order bandpass filter.

4. The telephone carrier system communication receiver defined in claim 1 wherein said channel bandpass filter is a first order bandpass filter having a frequency response that attenuates an adjacent incoming carrier signal spaced 8 kHz from said pre-selected one of said carrier signals by a pre-selected amount relative to the level of said pre-selected one or said carrier signals, said pre-selected amount being in the range extending from 13 db to 15 db.

5. The telephone carrier system communication receiver defined in claim 1 wherein said channel bandpass filter is a first order filter having a frequency response that attenuates an adjacent incoming carrier signal spaced 8 kHz from said pre-selected one of said carrier signals by approximately 15 db relative to the level of said pre-selected one of said incoming carrier signals to which said filter is tuned.

6. The telephone carrier system communication receiver defined in claims 1, 2, 3, 4 or 5 wherein said filter comprises a parallel LC resonant circuit.

7. The telephone carrier system communication receiver defined in claims 1, 2, 3, 4 or 5 wherein said means for synchronously detecting said pre-selected one of said incoming carrier signals comprises a synchronous detector and a zero crossover detector, said filter being connected to pass said pre-selected one of said carrier signals for application to said synchronous detector and to said zero crossover detector, said zero crossover detector having means for sensing the zero crossovers of said pre-selected one of said carrier signals for developing an a.c. synchronous signal having the same frequency as said pre-selected one of said carrier signals, said synchronous signal being at least approximately in phase or at least approximately 180° out of phase with said pre-selected one of said carrier signals, and said zero crossover detector being connected to said synchronous detector for applying said synchronous signal thereto to effect the synchronous detection of said pre-selected one of said carrier signals.

8. The telephone carrier system communication receiver defined in claim 7 wherein said bandpass filter comprises a transformer for coupling said pre-selected one of said carrier signals to said synchronous detector and said zero crossover detector, and said synchronous detector comprising a switching device that is cyclically turned on and off by said synchronous signal for rectifying said pre-selected one of said carrier signals.

9. The telephone carrier system communication receiver defined in claim 8 wherein said bandpass filter further includes a capacitor connected across the secondary coil of said transformer to form a parallel resonant circuit that is tuned to the frequency of said pre-selected one of said incoming carrier signals.

10. The telephone carrier system communication receiver defined in claim 7 including a low pass filter connected to the output of said synchronous detector for passing the voice frequency components of detection up to a pre-selected cutoff frequency and for rejecting components of detection above said cutoff frequency, said synchronous detector comprising a switching device having an input electrode, an output electrode and a control electrode, said zero crossover detector having an output connected to said control electrode to apply said synchronous signal thereto, a transformer forming a part of said bandpass filter for coupling said pre-selected one of said incoming carrier signals to said zero crossover detector and to said input electrode of said switching device, said switching device being controlled by said synchronous signal to complete a current conducting circuit between its input and output electrodes on the synchronous signal alternations of one pre-selected polarity and to open the current conducting circuit between its input and output electrodes on the synchronous signal alternations of the polarity opposite to said pre-selected polarity to develop a rectification of said pre-selected one of said carrier signals at said output electrode, and the output electrode of said switching device being connected to said low pass filter for feeding the rectified carrier signal thereto.

11. The telephone carrier system communication receiver defined in claim 10 wherein said bandpass filter includes a capacitor connected across the secondary coil of said transformer to define a parallel resonant circuit that is tuned to the frequency of said pre-selected one of said incoming carrier signals.

12. The telephone carrier system communication receiver defined in claim 10 wherein said low pass filter is a single coil elliptic filter in which the single coil provides peaking that complements the rolloff of said bandpass filter to flatten the frequency response in voice frequency range up to said cutoff frequency.

13. The telephone carrier system communication receiver defined in any one of the claims 1, 2, 3, 4 or 5 including a single coil elliptic low pass filter having a cutoff of about 3000 Hz, said means for synchronously detecting said pre-selected one of said carrier signals including a synchronous detector connected between said bandpass filter and said low pass filter for rectifying said pre-selected one of said carrier signals and applying the rectification of said carrier signal to said low pass filter for filtering.

14. The telephone carrier system communication receiver defined in claim 1 wherein said filter has first and second terminals and means connected to said terminals to provide said pre-selected one of said carrier signals at said first terminal and a phase displaced replica of said pre-selected one of said carrier signals at said second terminal, said replica being displaced in phase by 180° from said pre-selected one of said carrier signals but otherwise corresponding to said pre-selected one of said carrier signals, said means for synchronously detecting the carrier signal passed by said filter comprising first and second rectifying switching devices electrically connected to said first and second terminals, respectively, means connected to said first and second terminals and driven by said pre-selected one of said carrier signals and said replica to provide first and second drive signals at separate output terminals, said drive signals being displaced in phase by 180° relative each other at the frequency of said pre-selected one of said carrier signals, said first switching device being electrically connected to one of said output terminals and being driven by one of said first and second drive signals for rectifying said pre-selected one of said carrier signals to provide a first half-wave rectified signal, said second switching device being electrically connected to another one of said output terminals and being driven by the other of said first and second drive signals for rectifying said replica to provide a second half-wave rectified signal, and means combining said first and second half-wave rectified signals to provide a full-wave rectified signal.

15. A telephone carrier system communication receiver for receiving a pre-selected one of a plurality of incoming amplitude modulated carrier signals of different pre-selected frequencies in a plural channel amplitude modulated telephone carrier system, comprising a pre-detection bandpass filter having an order that is not greater than two, a low pass filter, a synchronous detector connected between said bandpass filter and said low pass filter, a transformer forming a part of said bandpass filter and having a secondary coil center tapped to ground to transform said pre-selected one of said carrier signals into two carrier signal voltages that are 180 degrees out of phase with each other, one of said carrier signal voltages being developed across one of the secondary coil terminals and the secondary coil's center tap to ground, and the other of said carrier signal voltages being developed across the other of the secondary coil terminals and said center tap, a zero crossover detector, said secondary coil being connected to said crossover detector for applying said two carrier signal voltages thereto, and said zero crossover detector having means for sensing the zero crossovers of said carrier signal voltages to develop first and second a.c. output signals, said first output signal being matched in phase and frequency with one of said carrier signal voltages, and said second output signal being matched in phase and frequency with the other of said carrier signal voltages, said synchronous detector including first and second switching devices each having an input electrode, an output electrode and a control electrode, said one of said secondary coil terminals being connected to the input electrode of said first switching device to apply said one of said carrier signal voltages thereto, said other of said secondary coil terminals being connected to the input electrode of said second switching device for applying the other of said carrier signal voltages thereto, said zero crossover detector being connected to the control electrode of said first switching device for applying said first output signal thereto to cyclically turn said first switching device on and off in synchronism with the alternations of said one of said carrier signal voltages to synchronously detect said one of said carrier signal voltages and thereby develop a half wave rectification of said one of said carrier signal voltages at the output electrode of said first switching device, said zero crossover detector being further connected to the control electrode of said second switching device for applying said second output signal thereto to cyclically turn said second switching device on and off in synchronism with the alternations of the other of said carrier signal voltages to synchronously detect the other of said carrier signal voltages and thereby develop a half wave rectification of the other of said carrier signal voltages at the output electrode of said second switching device, the half wave rectification at the output electrode of said second switching device having the same polarity as, but being 180 degrees out of phase with, the half wave rectification at the output electrode of said first switching, the output electrodes of said first and second switching devices being interconnected at a common junction to establish a full wave rectified carrier signal from the half wave rectifications on the output electrodes of said first and second switching devices, and circuit means for feeding the full wave rectified signal from said common junction to said low pass filter for filtering.

16. The telephone carrier system communication receiver defined in claim 15 wherein said bandpass filter is a first order filter.

17. In a plural channel, amplitude modulated telephone carrier system, a plurality of first carrier transmitting and receiving terminal circuits each having a transmitter for transmitting one of a plurality of first amplitude modulated frequency division multiplexed carrier signals equal in number to the number of said first terminal circuits, a plurality of second carrier transmitting and receiving terminal circuits each having a receiver for receiving a different pre-selected one of said first carrier signals and a transmitter for transmitting one of a plurality of second frequency division multiplexed carrier signals equal in number to the number of said terminal circuits, and means establishing two-way communication between said first and second terminal circuits including (a) a two-conductor transmission line over which said first and second carrier signals are transmitted and (b) a four-wire terminal circuit connecting one end of said transmission line to said second terminal circuits, said four-wire terminal circuit having means establishing two separate signal paths, one for feeding the composite of said first carrier signals to the receivers of said second terminal circuits and the other for feeding the composite of said second carrier signals from the transmitters of said second terminal circuits to said transmission line for transmission to said first terminal circuits, and each of said first terminal circuits having a receiver for receiving a different pre-selected one of said second carrier signals, each of the second terminal circuit receivers including (a) a first order bandpass filter tuned to the frequency of the one of said first carrier signals to be received, and (b) means for synchronously detecting the carrier signal to which the bandpass filter is tuned, said first carrier signals being transmitted from said first terminal circuits at a common pre-selected level so that they arrive at said four-wire terminal circuit at different levels determined by their carrier frequencies, and said four-wire terminal circuit further including (a) means responsive to the level of at least one carrier signal transmitted over said transmission line for developing a d.c. signal that varies as a function of the length of said transmission line and (b) variable attenuator means under the control of said d.c. signal for adjusting the levels of said first carrier signals in the composite fed along said one of said signal paths to cause the first carrier signals to arrive at the bandpass filter in each of said second terminal circuits at least approximately at a common level.

18. In a plural channel, amplitude modulated telephone carrier system, a plurality of first carrier transmitting and receiving terminal circuits each having a transmitter for transmitting one of a plurality of first amplitude modulated frequency division multiplexed carrier signals equal in number to the number of said first terminal circuits, a plurality of second carrier transmitting and receiving terminal circuits each having a receiver for receiving a different pre-selected one of said first carrier signals and a transmitter for transmitting one of a plurality of second frequency division multiplexed carrier signals equal in number to the number of said terminal circuits, and means establishing two-way communication between said first and second terminal circuits including (a) a two-conductor transmission line over which said first and second carrier signals are transmitted and (b) a four-wire terminal circuit connecting one end of said transmission line to said second terminal circuits, said four-wire terminal circuit having means for establishing two separate signal paths, one for feeding the composite of said first carrier signals to the receivers of said second terminal circuits and the other for feeding the composite of said second carrier signals from the transmitters of said second terminal circuits to said transmission line for transmission to said first terminal circuits, and each of said first terminal circuits having a receiver for receiving a different pre-selected one of said second carrier signals, the first terminal circuit receivers each including (a) a bandpass filter tuned to the frequency of the one of said second carrier signals to be received and having an order no greater than two, and (b) means for synchronously detecting the carrier signal to which said bandpass filter is tuned, said four-wire terminal circuit further including (a) means responsive to the level of at least one carrier signal transmitted over said transmission line for developing a d.c. control signal that varies as a function of the length of said transmission line and (b) variable attenuator means under the control of said d.c. signal for adjusting the levels of said second carrier signals in the composite fed along said other of said signal paths to cause said second carrier signals to arrive at the bandpass filters in the receivers of said first terminal circuits at least approximately at a common level.

19. A plural channel amplitude modulated station carrier system comprising a plurality of first telephone carrier transmitting and receiving terminal units located at a central office and each having a transmitter for transmitting one of a plurality of first frequency division multiplexed carrier signals corresponding in number to the number of said first terminal units, a plurality of second telephone carrier transmitting and receiving terminal units grouped together at a common terminal remote from said central office and each having a transmitter for transmitting one of a plurality of second frequency division multiplexed carrier signals corresponding in number to the number of said second transmitting and receiving terminal units, signal transmission means including a two conductor transmission line connected intermediate said common terminal and the first terminal units at said central office for transmitting said first carrier signals to said second terminal units and said second carrier signals to said first terminal units, said first terminal units each having a receiver for receiving a different pre-selected one of said second carrier signals, and said second terminal units each having a receiver for receiving a different pre-selected one of said first carrier signals, and a four-wire group terminal unit located at said common terminal intermediate one end of said transmission line and the plurality of said second terminal units, said group terminal unit having a first signal transmission path providing for the transmission of the composite of said second carrier signals from the second terminal units to said transmission line and a second signal transmission path providing for the transmission of the composite of said first carrier signals from said line to said second terminal units, said group terminal unit further including an automatic carrier level coordination control circuit adapted to coordinate the levels of said second carrier signals with the levels of additional carrier signals transmitted in the same direction as said second carrier signals in at least one other plural channel amplitude modulated station carrier system which is also equipped to effect automatic carrier level coordination control of said additional carrier signals, said automatic carrier level coordination control circuit comprising first means under the control of the levels of a pre-selected number of said first carrier signals arriving at said second signal path from said transmission line for producing a d.c. control signal that varies as a function of the length of said transmission line, second means acting on the composite of said second carrier signals transmitted along first signal path for adjusting the level of each of said second carrier signals as a function of its own carrier frequency and third means acting on the composite of the second carrier signals transmitted along said first signal path for further adjusting the level of each of said second carrier signals as a function of the magnitude of said control signal, the combined carrier level adjustment provided by said second and third means being such that at any given distance measured along said transmission line from said central office or other termination of said line, the level of each of the second carrier signals remains at least approximately the same regardless of the length of the transmission line.

* * * * *